(12) United States Patent
Dagher et al.

(10) Patent No.: US 9,394,035 B2
(45) Date of Patent: Jul. 19, 2016

(54) FLOATING WIND TURBINE PLATFORM AND METHOD OF ASSEMBLING

(71) Applicant: University of Maine System Board of Trustees, Bangor, ME (US)

(72) Inventors: Habib J. Dagher, Veazie, ME (US); Anthony M. Viselli, Bangor, ME (US); Andrew J. Goupee, Dedham, ME (US)

(73) Assignee: University of Maine System Board of Trustees, Bangor, ME (US)

( * ) Notice: Subject to any disclaimer, the term of this patent is extended or adjusted under 35 U.S.C. 154(b) by 678 days.

(21) Appl. No.: 13/863,074

(22) Filed: Apr. 15, 2013

(65) Prior Publication Data

US 2013/0233231 A1    Sep. 12, 2013

Related U.S. Application Data

(63) Continuation-in-part of application No. PCT/US2011/059335, filed on Nov. 4, 2011.

(60) Provisional application No. 61/410,127, filed on Nov. 4, 2010, provisional application No. 61/624,050, filed on Apr. 13, 2012, provisional application No. 61/653,816, filed on May 31, 2012.

(51) Int. Cl.
| | |
|---|---|
| *F03D 11/04* | (2006.01) |
| *B63B 35/44* | (2006.01) |
| *B63B 21/50* | (2006.01) |

(52) U.S. Cl.
CPC .................. *B63B 35/44* (2013.01); *B63B 21/50* (2013.01); *F03D 13/20* (2016.05); *F03D 13/25* (2016.05);

(Continued)

(58) Field of Classification Search
CPC .................. B63B 2035/4433; B63B 2035/446; B63B 2035/4466; F03D 11/04; F03D 11/045; F03D 13/20; F03D 13/22; F03D 13/25; F05B 2230/60; F05B 2230/601; F05B 2230/604; F05B 2230/606; F05B 2230/608; F05B 2230/61; F05B 2230/6102; F05B 2240/931; F05B 2240/932; F05B 2240/95; F05B 2240/97; E04B 1/5825; E04B 1/5831; E04B 1/5837; E04B 2001/2406
See application file for complete search history.

(56) References Cited

U.S. PATENT DOCUMENTS

| | | | | |
|---|---|---|---|---|
| 6,488,446 B1 * | 12/2002 | Riemers | .................. | B63B 21/27 114/296 |
| 6,601,649 B2 * | 8/2003 | Beato | ..................... | B63B 21/50 166/352 |

(Continued)

FOREIGN PATENT DOCUMENTS

| | | |
|---|---|---|
| CN | 1767976 A | 5/2006 |
| CN | 1817737 A | 8/2006 |

(Continued)

OTHER PUBLICATIONS

International Search Report and Written Opinion, Application No. PCT/US2013/036596, dated Jul. 8, 2013.

(Continued)

*Primary Examiner* — Igor Kershteyn
*Assistant Examiner* — Christopher R Legendre
(74) *Attorney, Agent, or Firm* — MacMillan, Sobanski & Todd, LLC

(57) ABSTRACT

A semisubmersible wind turbine platform capable of floating on a body of water and supporting a wind turbine over a vertical center column includes a vertical center column and three or more vertical outer columns spaced radially from the center column, each of the outer columns being connected to the center column with one or more of bottom beams, top beams, and struts, with the major structural components being made of concrete and having sufficient buoyancy to support a wind turbine tower.

42 Claims, 29 Drawing Sheets

(52) U.S. Cl.
CPC ... *B63B 2035/446* (2013.01); *F05B 2230/6102* (2013.01); *F05B 2240/95* (2013.01); *Y10T 29/49826* (2015.01)

(56) References Cited

U.S. PATENT DOCUMENTS

| | | | |
|---|---|---|---|
| 6,957,519 B2 * | 10/2005 | Hiragaki | E04C 3/04 52/854 |
| 7,086,809 B2 | 8/2006 | Busso | |
| 7,156,037 B2 | 1/2007 | Borgen | |
| 7,234,409 B2 * | 6/2007 | Hansen | B63B 25/002 114/258 |
| 7,242,107 B1 | 7/2007 | Dempster | |
| 7,281,881 B1 | 10/2007 | Cermelli et al. | |
| 7,476,074 B2 * | 1/2009 | Jakubowski | A01K 61/007 415/1 |
| 7,810,756 B2 * | 10/2010 | Alby | B64C 1/26 244/119 |
| 7,841,143 B2 * | 11/2010 | Jensen | E02D 27/42 52/126.6 |
| 8,082,719 B2 * | 12/2011 | Bagepalli | E04H 12/085 138/155 |
| 8,471,396 B2 | 6/2013 | Roddier et al. | |
| 8,622,011 B2 | 1/2014 | Jähnig et al. | |
| 8,752,495 B2 * | 6/2014 | Jahnig | B63B 1/04 114/264 |
| 9,243,418 B2 * | 1/2016 | Bogl | E04H 12/08 |
| 2003/0168864 A1 | 9/2003 | Heronemus et al. | |
| 2006/0165493 A1 | 7/2006 | Nim | |
| 2008/0014025 A1 | 1/2008 | They | |
| 2010/0008733 A1 * | 1/2010 | Stiesdal | B63B 21/50 405/224 |
| 2010/0101173 A1 | 4/2010 | Bagepalli | |
| 2010/0186651 A1 | 7/2010 | Luo | |
| 2011/0006539 A1 * | 1/2011 | Lefranc | F03D 9/005 290/55 |
| 2011/0037264 A1 | 2/2011 | Roddier et al. | |
| 2011/0148115 A1 | 6/2011 | Roznitsky et al. | |
| 2011/0155038 A1 | 6/2011 | Jahnig et al. | |
| 2011/0210233 A1 * | 9/2011 | Fang | F03D 11/04 248/673 |
| 2012/0014752 A1 * | 1/2012 | Caruso | B63B 21/50 405/205 |
| 2012/0103244 A1 * | 5/2012 | Gong | B63B 21/50 114/265 |
| 2013/0224020 A1 | 8/2013 | Dagher et al. | |
| 2013/0233231 A1 * | 9/2013 | Dagher | B63B 35/44 114/265 |
| 2013/0276687 A1 | 10/2013 | Roddier et al. | |
| 2016/0025064 A1 * | 1/2016 | Hashimoto | F03D 13/20 29/593 |
| 2016/0075413 A1 * | 3/2016 | Nebrera Garcia | E02D 27/42 114/122 |
| 2016/0096599 A1 * | 4/2016 | Huang | B63B 39/03 114/267 |

FOREIGN PATENT DOCUMENTS

| | | | | |
|---|---|---|---|---|
| CN | WO 2013040871 A1 * | 3/2013 | | B63B 35/44 |
| CN | 203158199 U * | 8/2013 | | |
| CN | 203652079 U * | 6/2014 | | |
| CN | 204415681 U * | 6/2015 | | |
| DE | 10300214 A1 * | 7/2004 | | H02G 1/10 |
| DK | WO 2011137903 A2 * | 11/2011 | | B63B 1/107 |
| EP | 2143629 A1 | 1/2010 | | |
| FR | 2970938 A1 * | 8/2012 | | B63B 1/107 |
| FR | WO 2013160579 A1 * | 10/2013 | | F03D 11/04 |
| GB | 2159468 A | 12/1985 | | |
| GB | 2344843 A | 6/2000 | | |
| GB | 2378679 A | 2/2003 | | |
| JP | 2003184729 A | 7/2003 | | |
| JP | 2009047069 A | 3/2009 | | |
| JP | 2009085167 A | 4/2009 | | |
| JP | 2009162229 A | 7/2009 | | |
| JP | 2009248792 A | 10/2009 | | |
| JP | 2010064648 A * | 3/2010 | | |
| JP | 2010064649 A | 3/2010 | | |
| JP | 2010115978 A | 5/2010 | | |
| JP | 2010280301 A * | 12/2010 | | |
| JP | 2012056333 A | 3/2012 | | |
| WO | 02087959 A2 | 11/2002 | | |
| WO | 2004/061302 A2 | 7/2004 | | |
| WO | 2004087494 A2 | 10/2004 | | |
| WO | 2009087200 A2 | 7/2009 | | |
| WO | 2009/131826 A2 | 10/2009 | | |
| WO | WO 2009131826 A2 * | 10/2009 | | B63B 35/44 |
| WO | 2010110329 A1 | 9/2010 | | |
| WO | WO 2010138978 A2 * | 12/2010 | | E02D 27/42 |
| WO | 2011137903 A2 | 11/2011 | | |
| WO | WO 2015120227 A1 * | 8/2015 | | F03D 1/001 |
| WO | WO 2015120229 A1 * | 8/2015 | | F03D 1/001 |

OTHER PUBLICATIONS

Notification of the First Office Action, Application 201180062603.9 dated Apr. 27, 2015.

PCT Written Opinion, Application No. PCT/US2014/057236, dated Jan. 8, 2015.

Extended European Search Report, Application No. 1183887.6 dated Dec. 18, 2014.

* cited by examiner

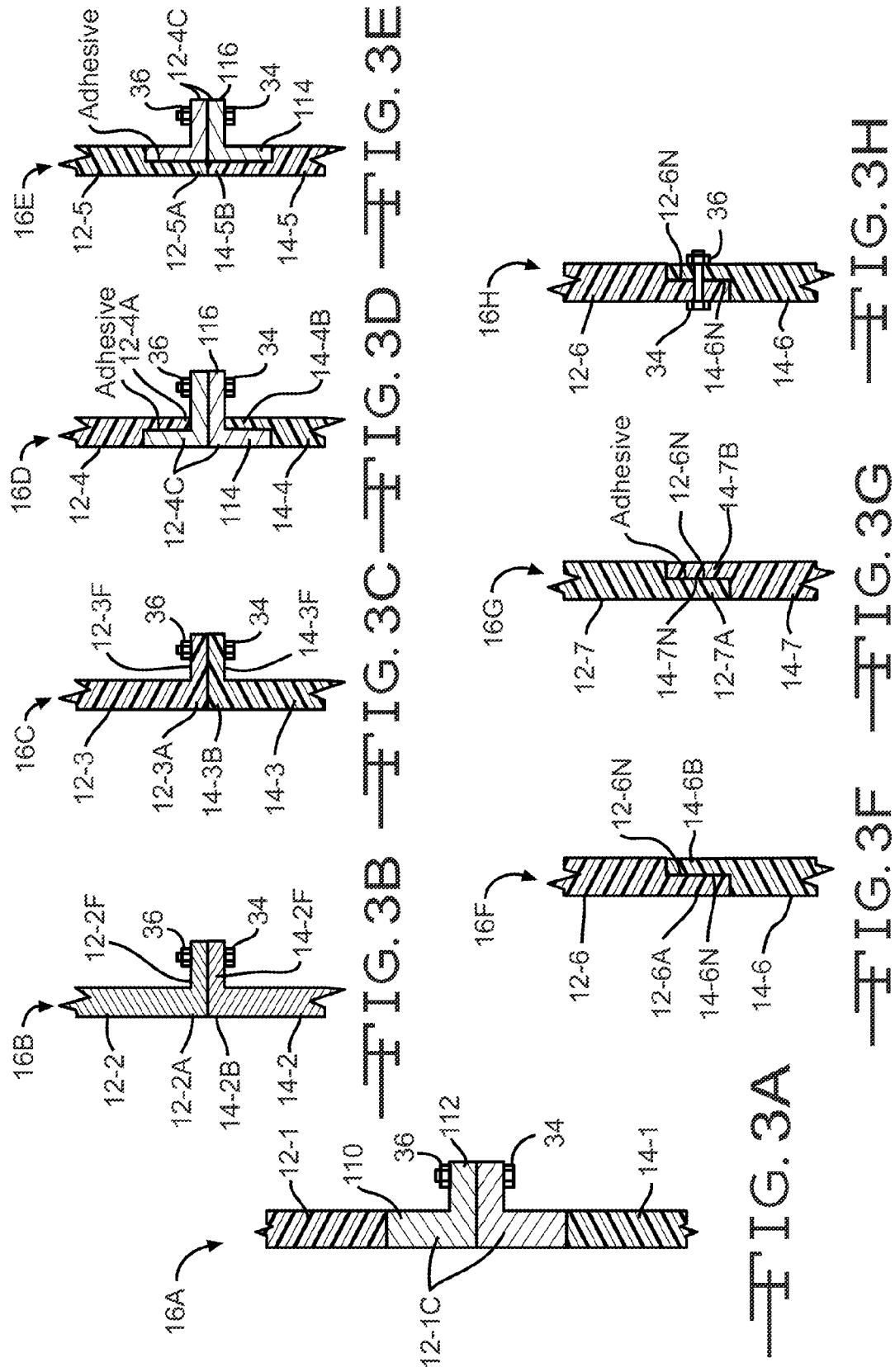

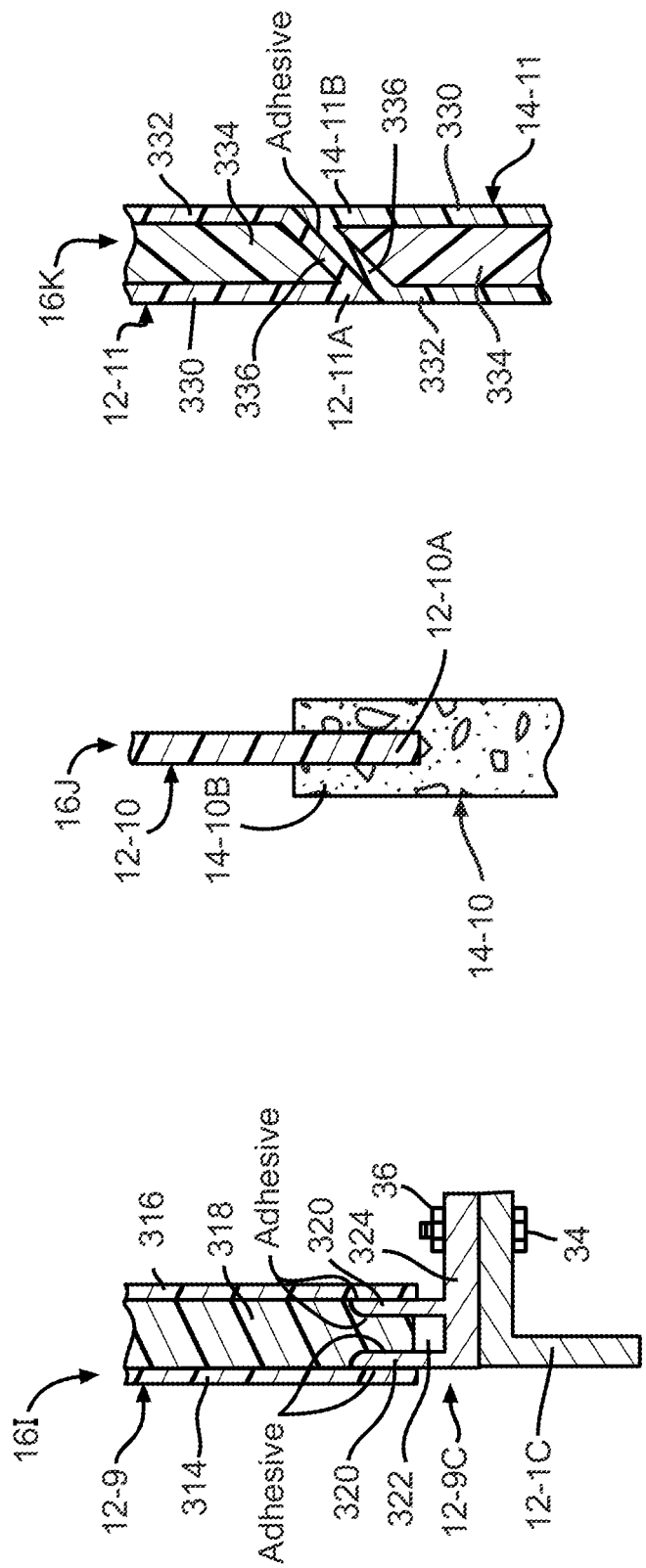

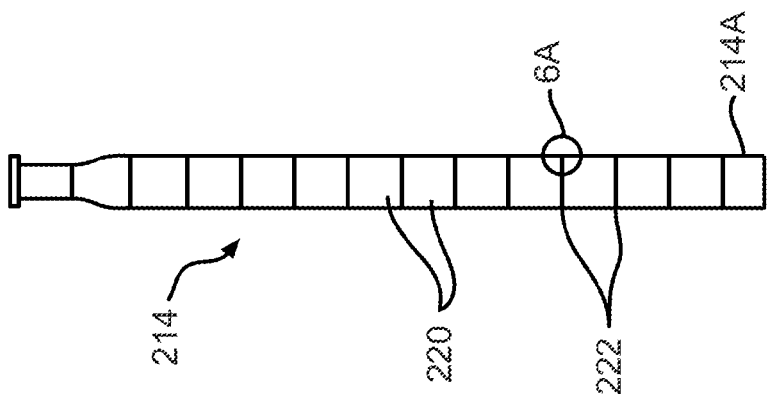
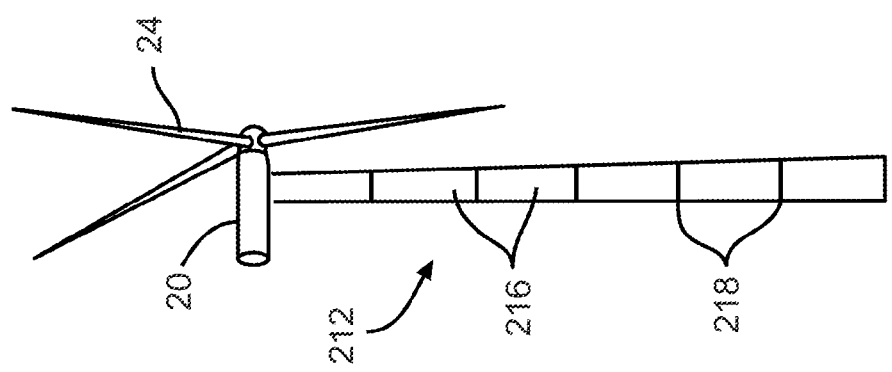
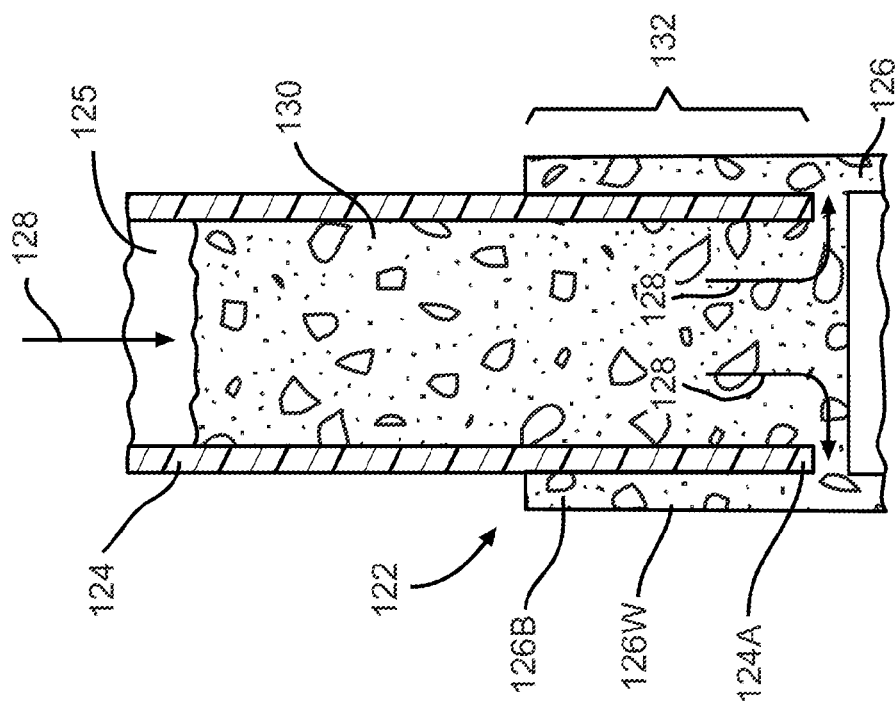

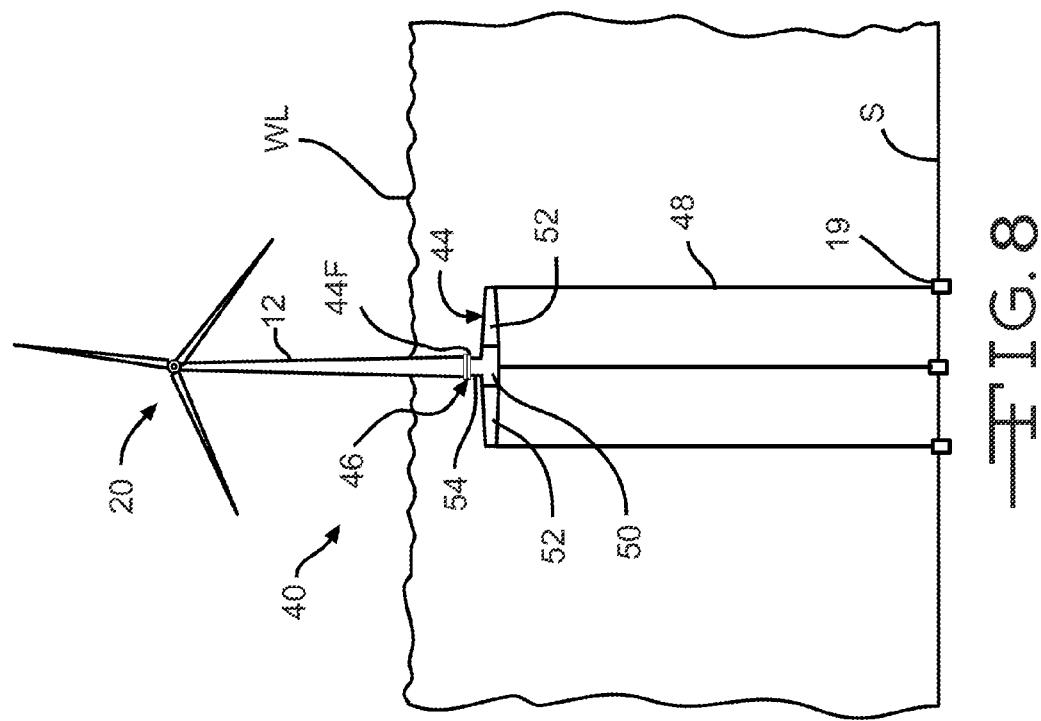
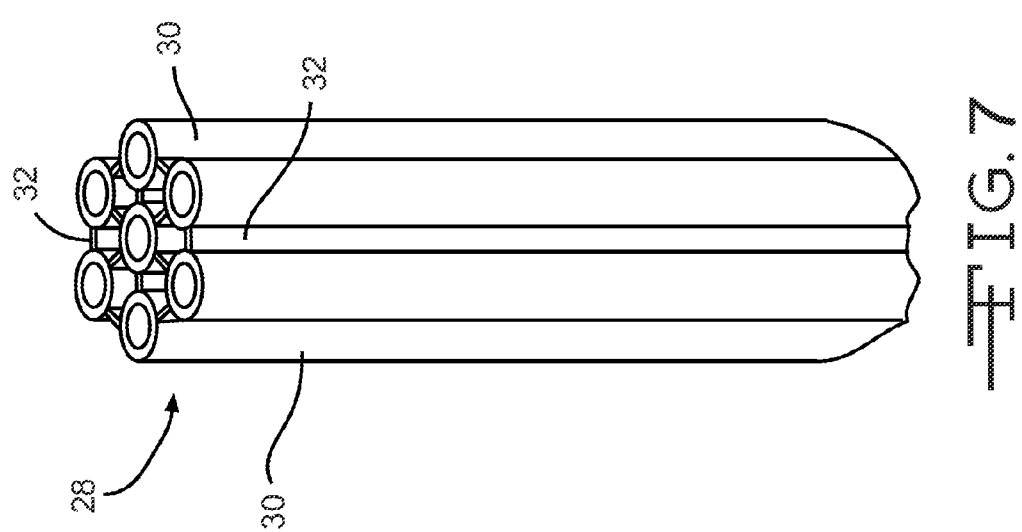

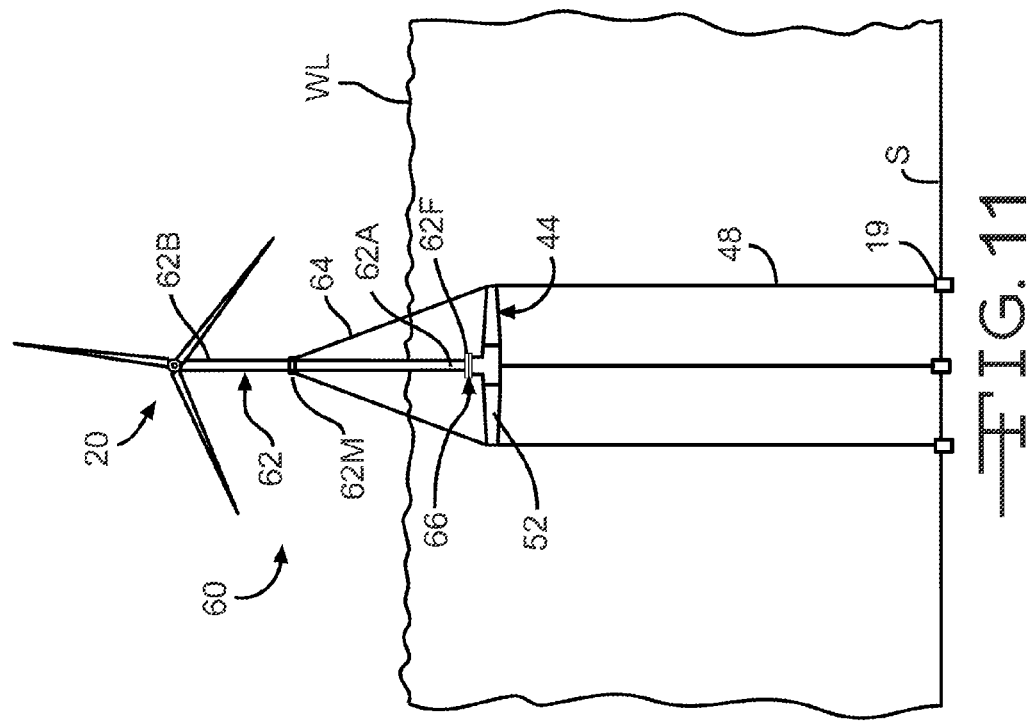
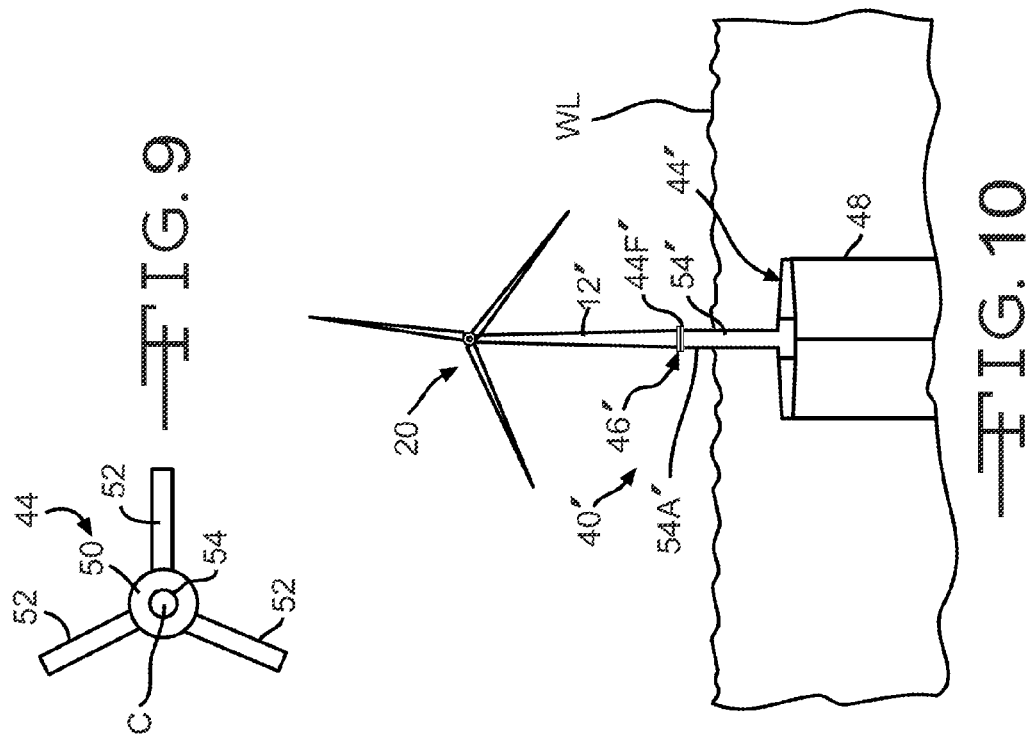

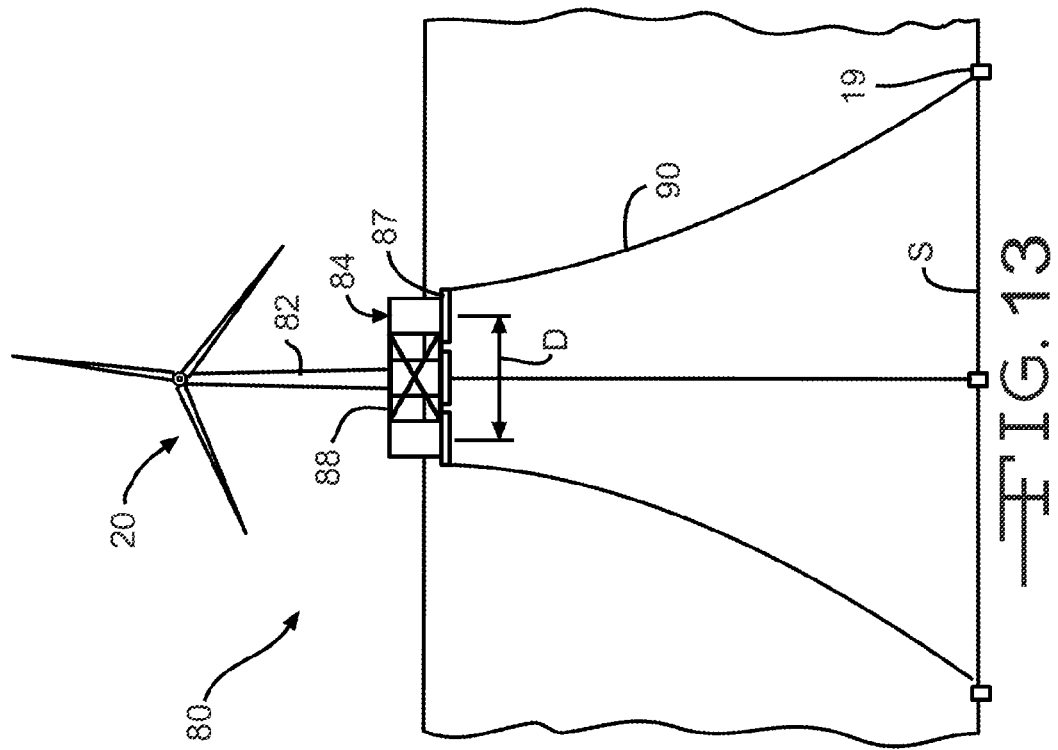
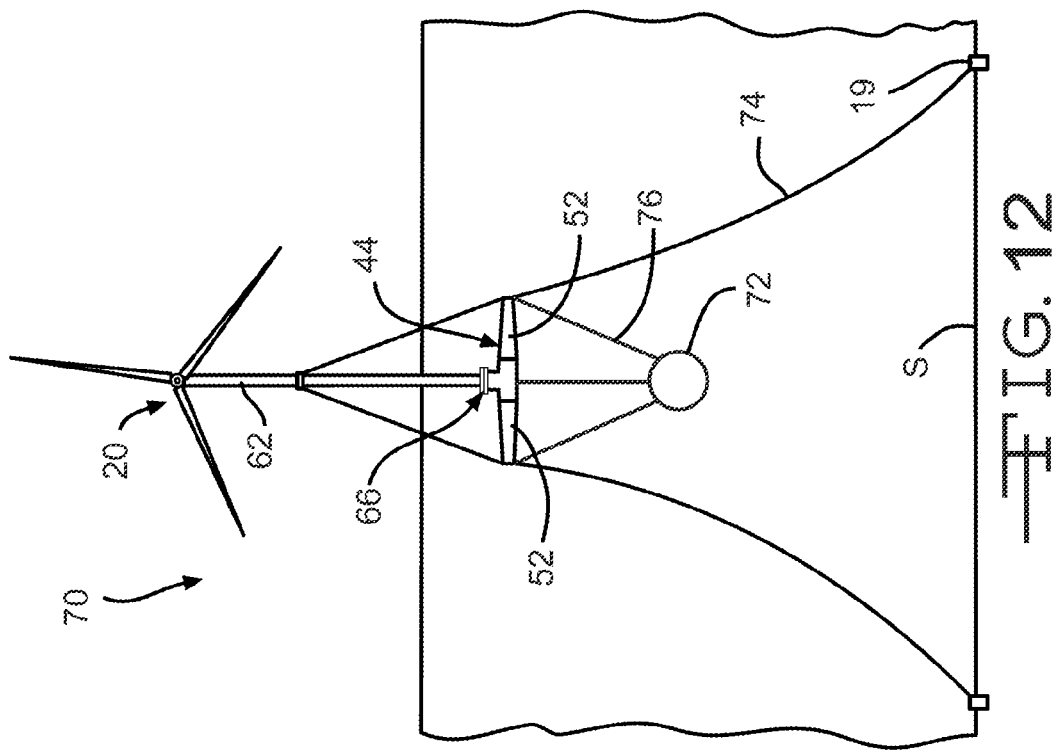

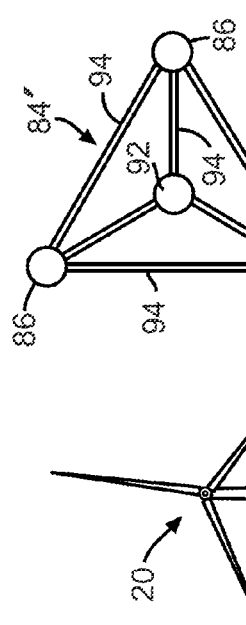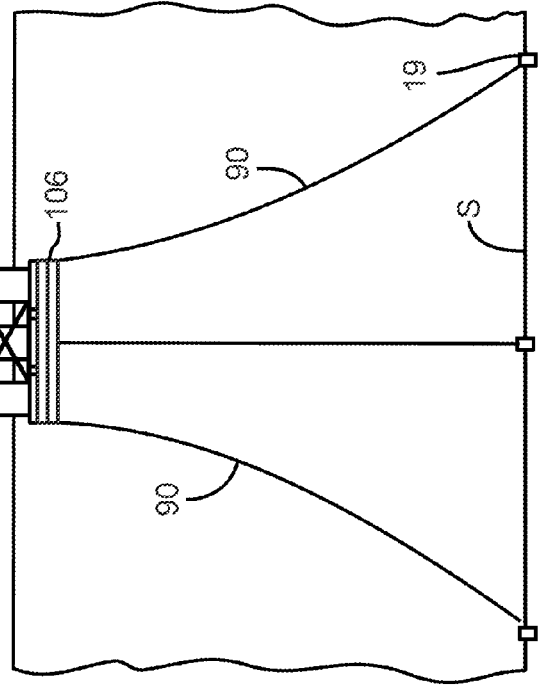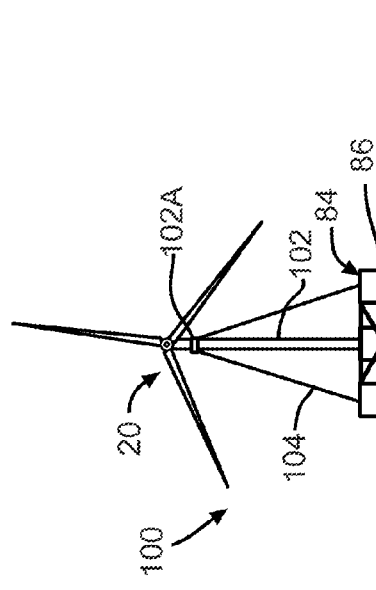

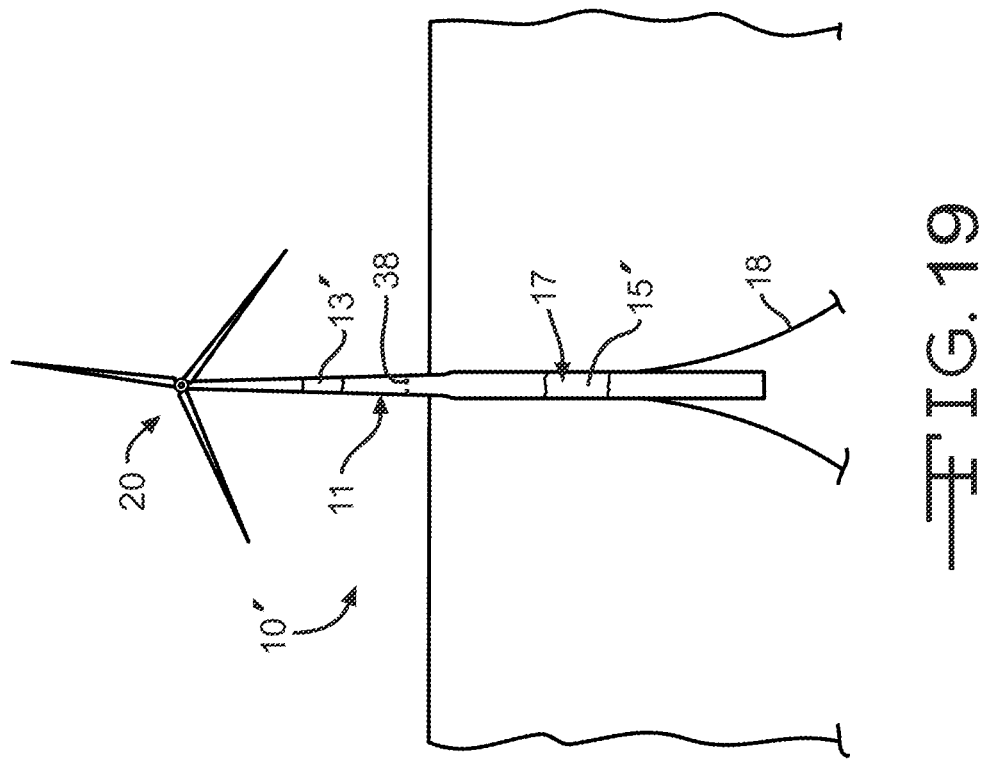
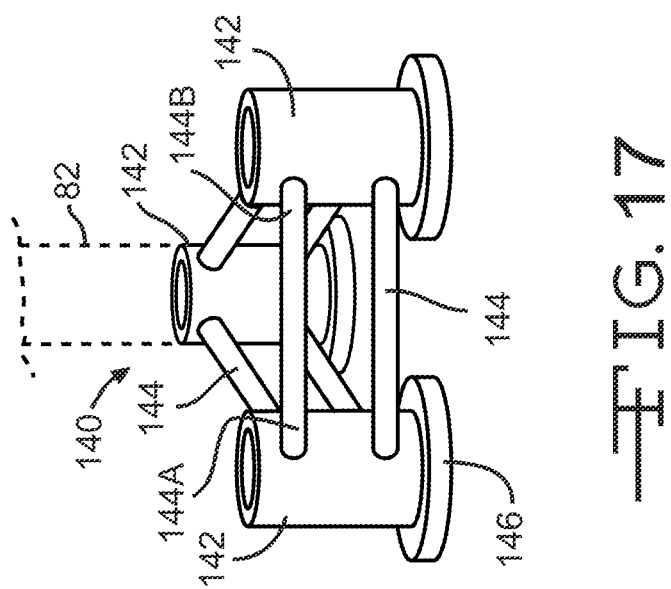

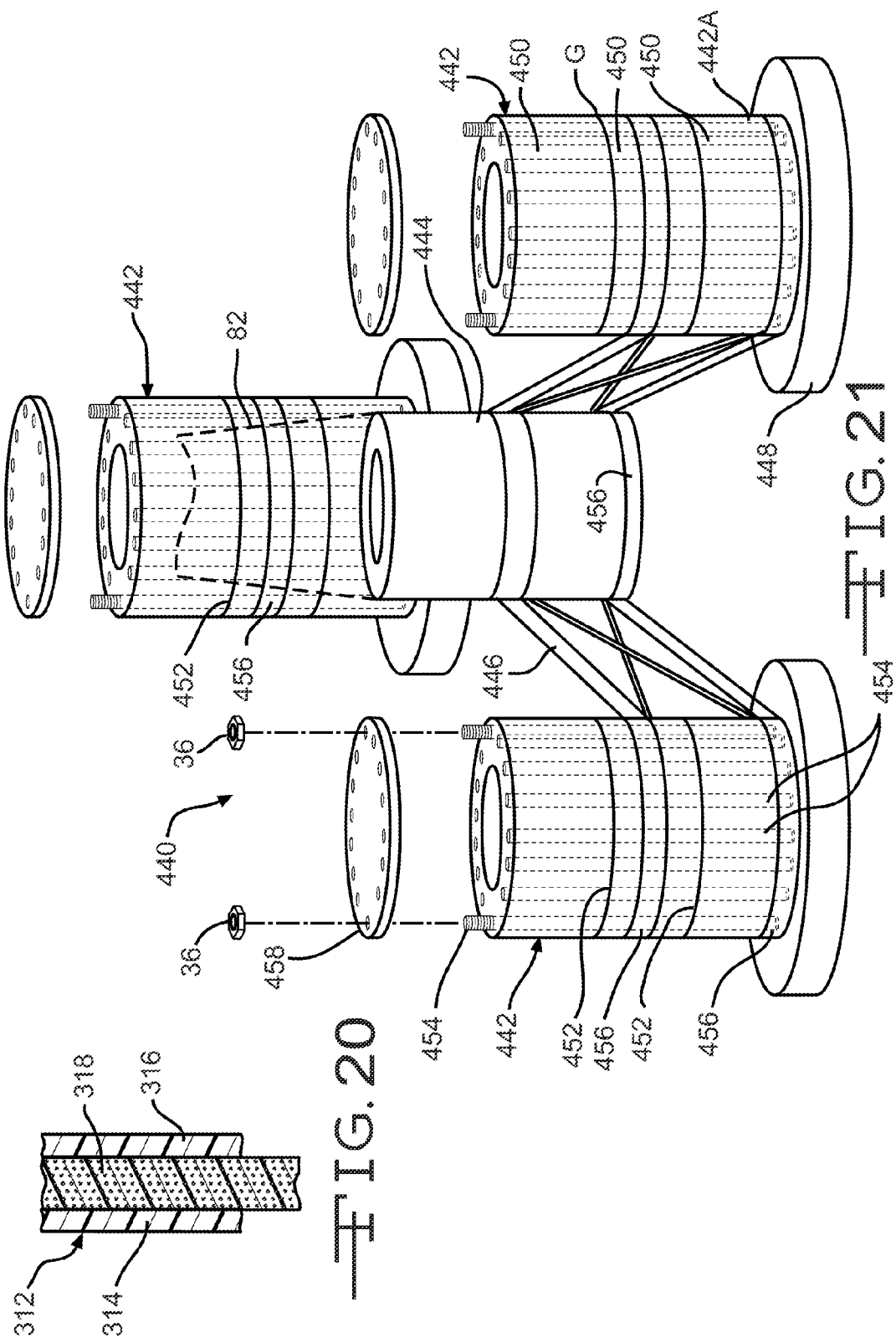

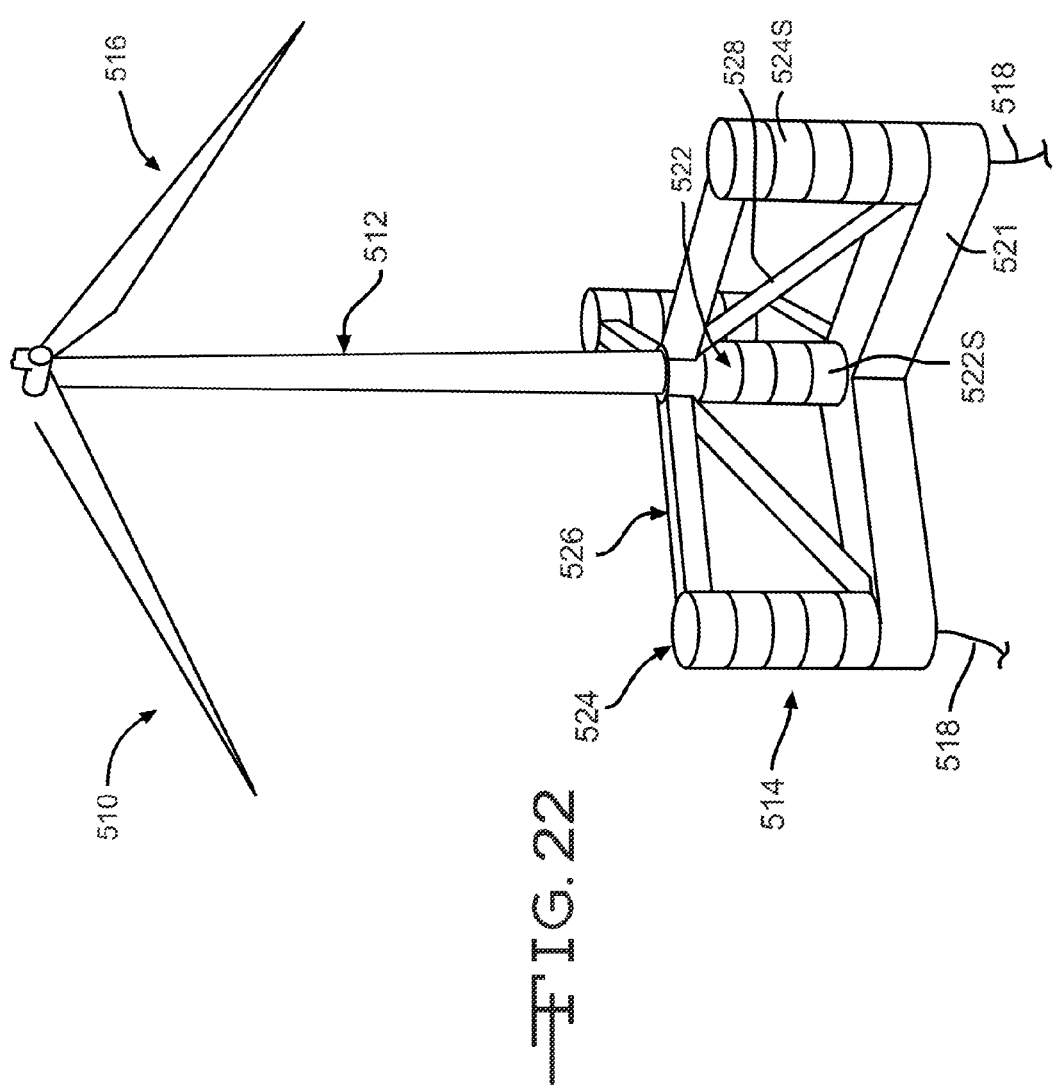

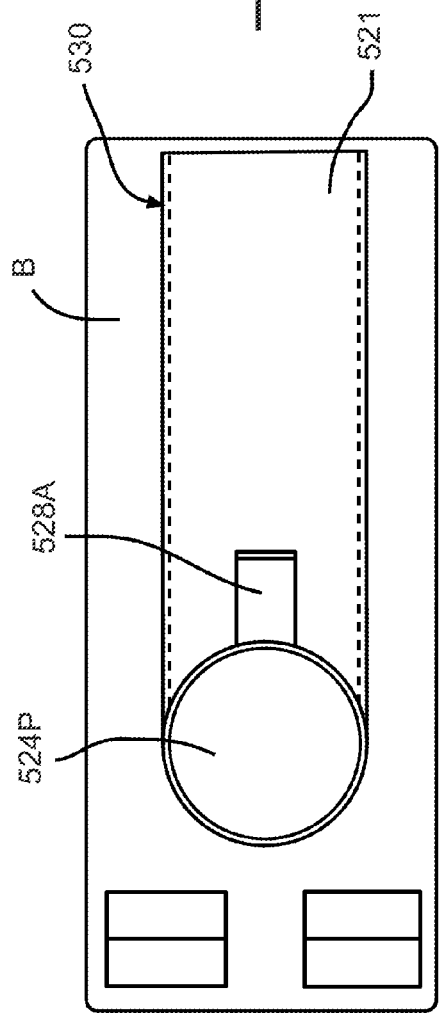
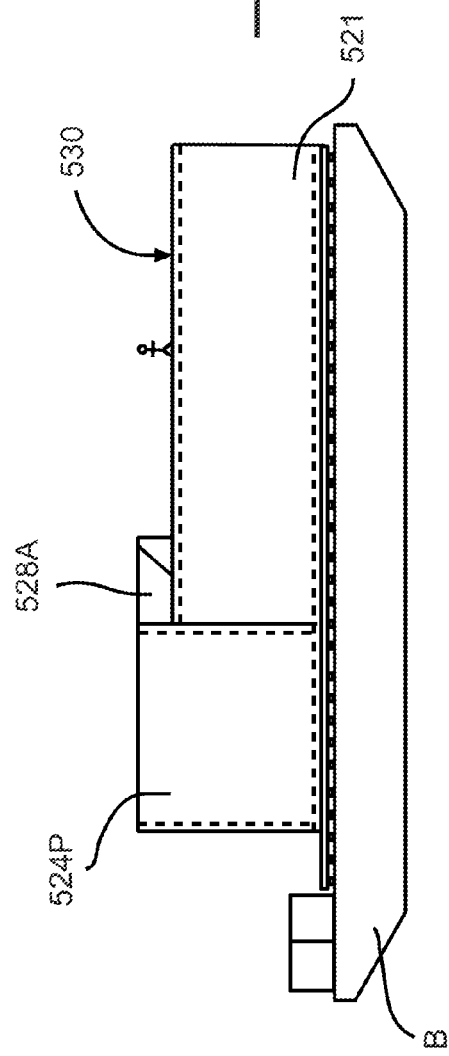
FIG. 23A
FIG. 23B

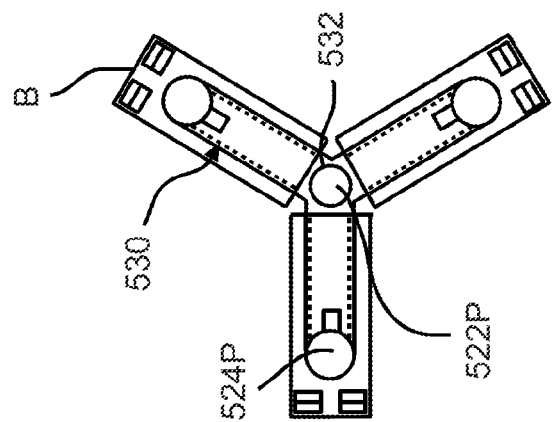
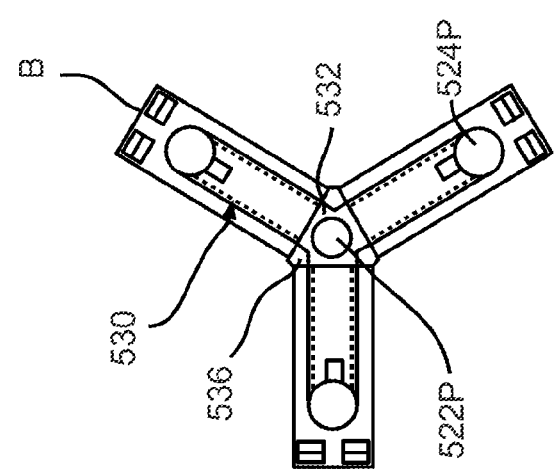
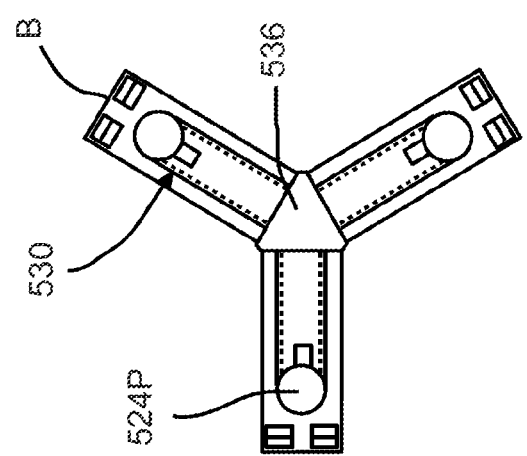

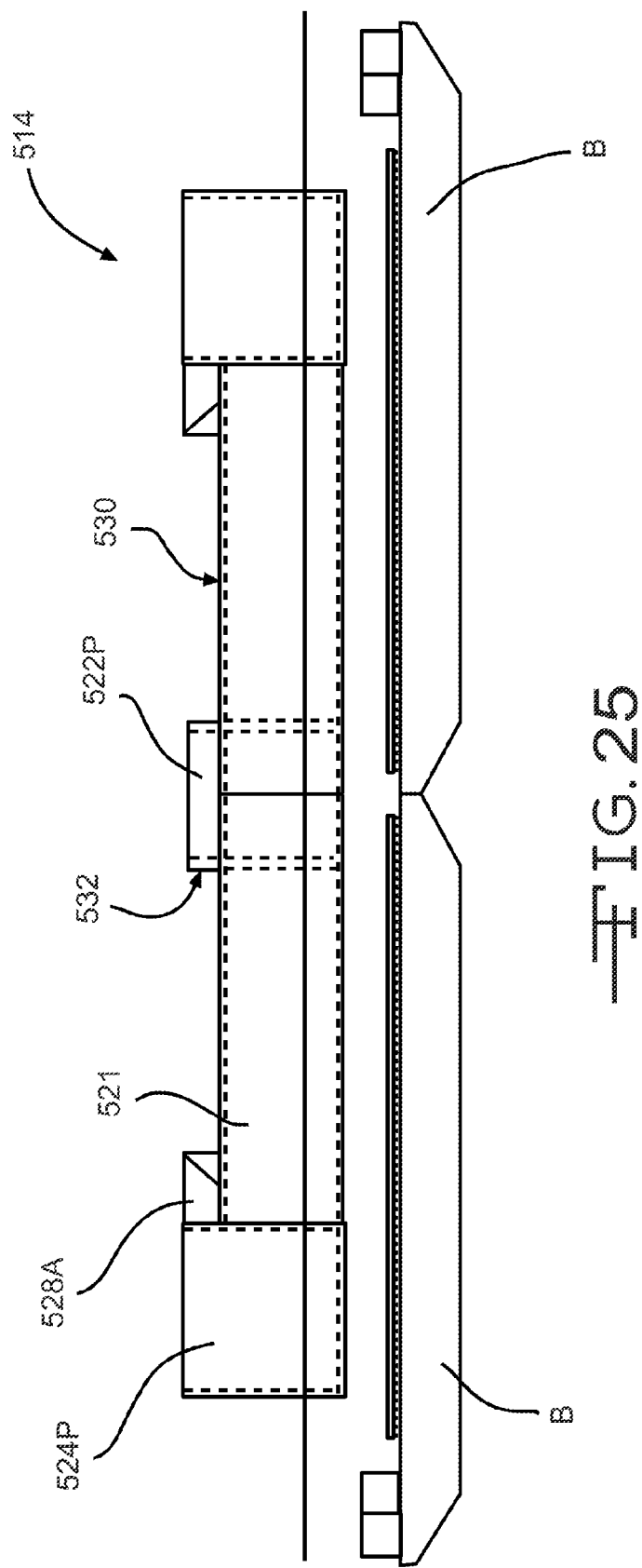

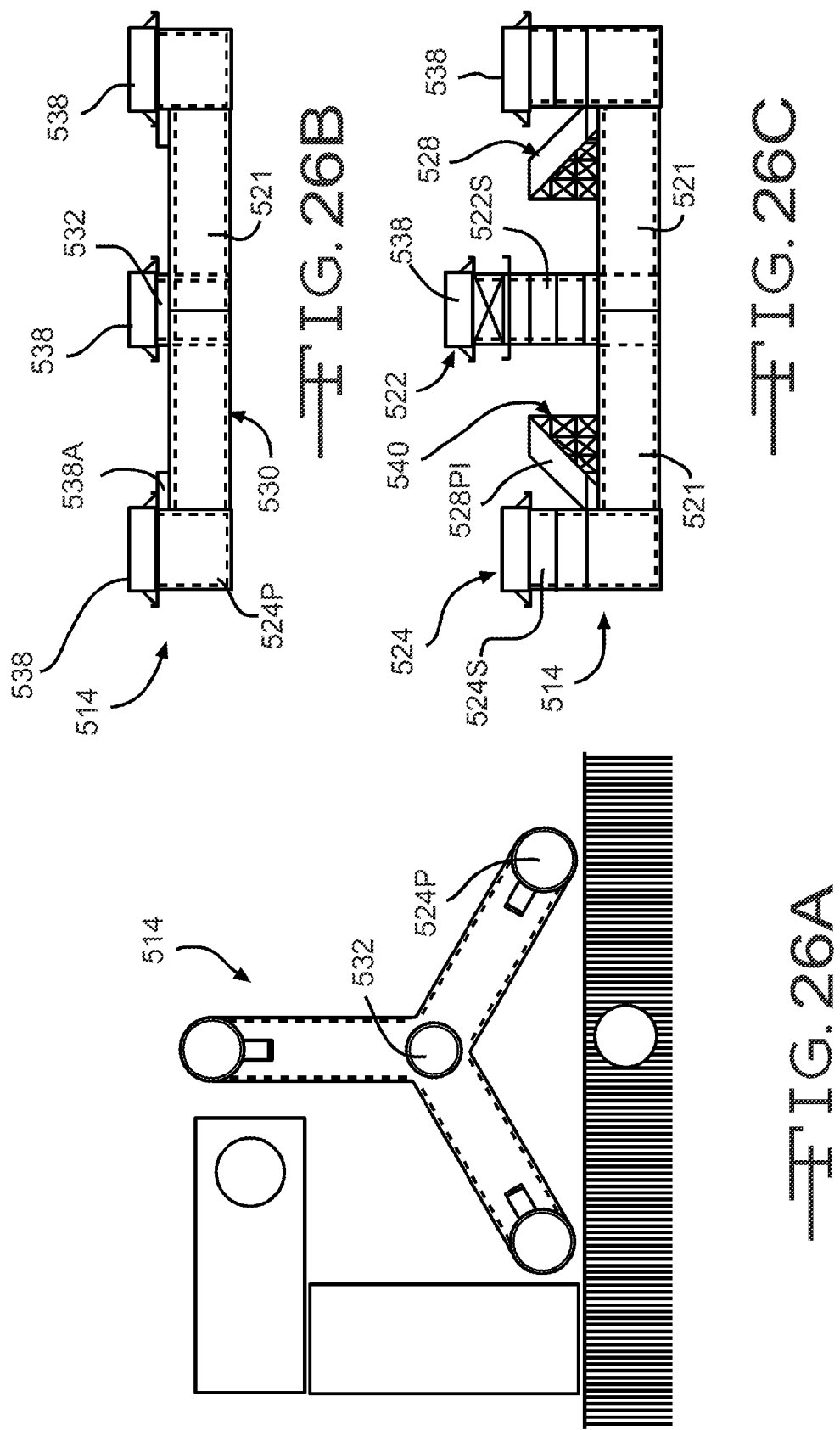

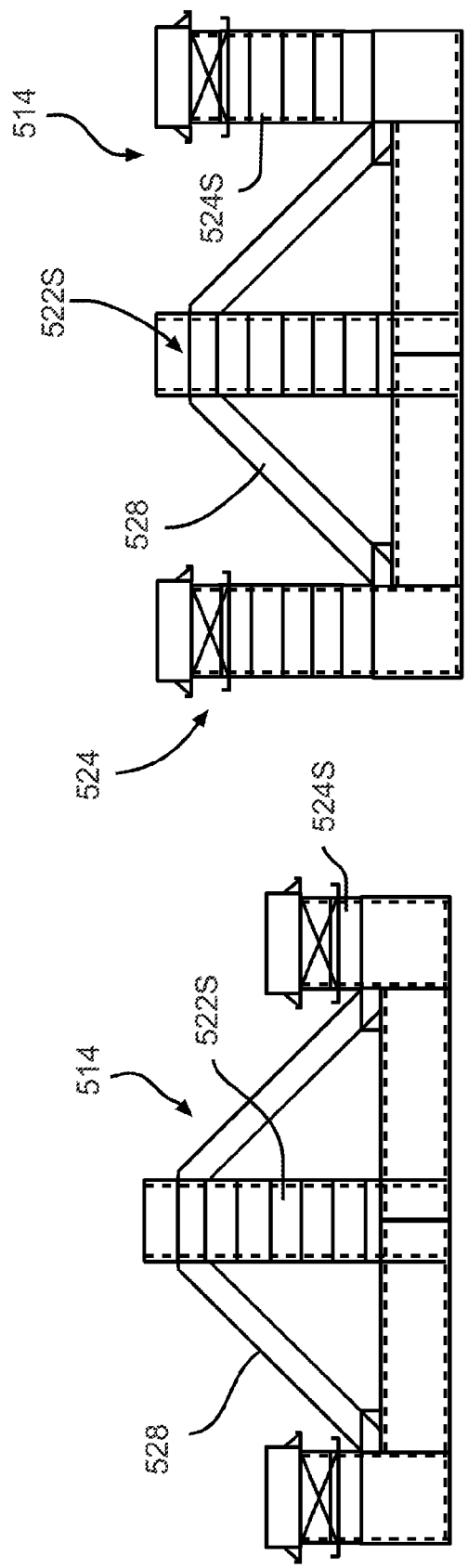

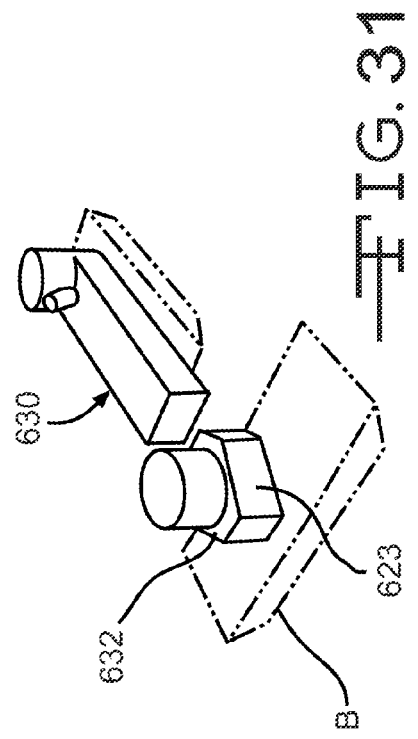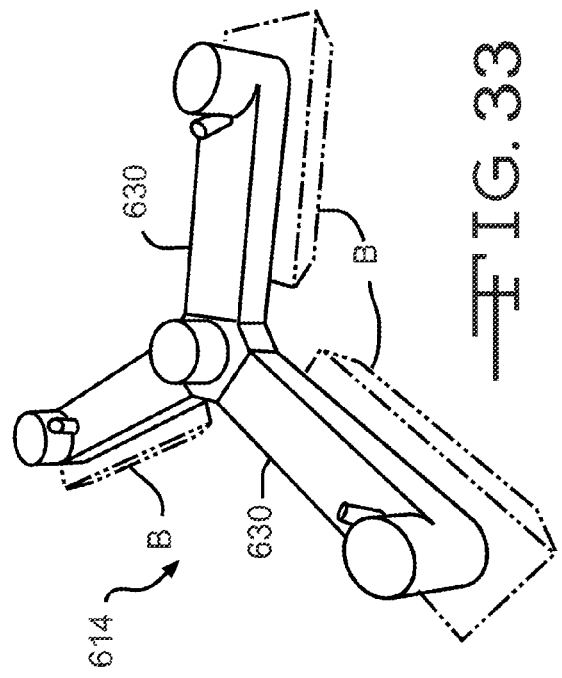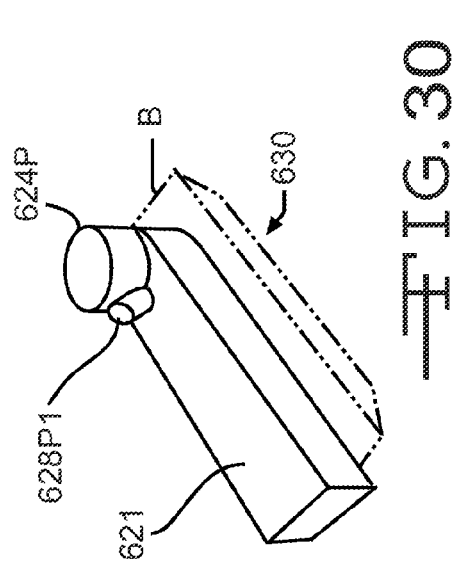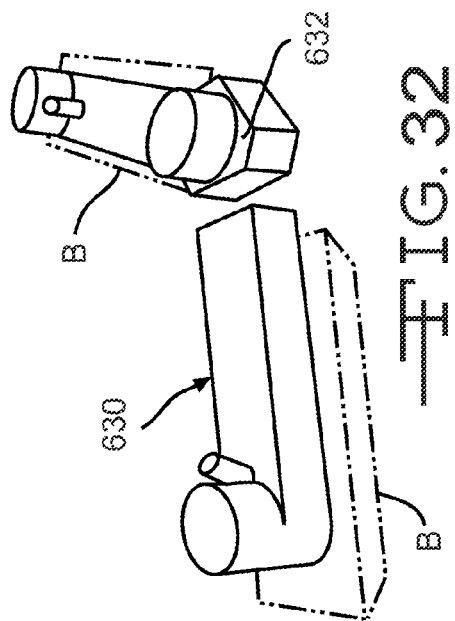

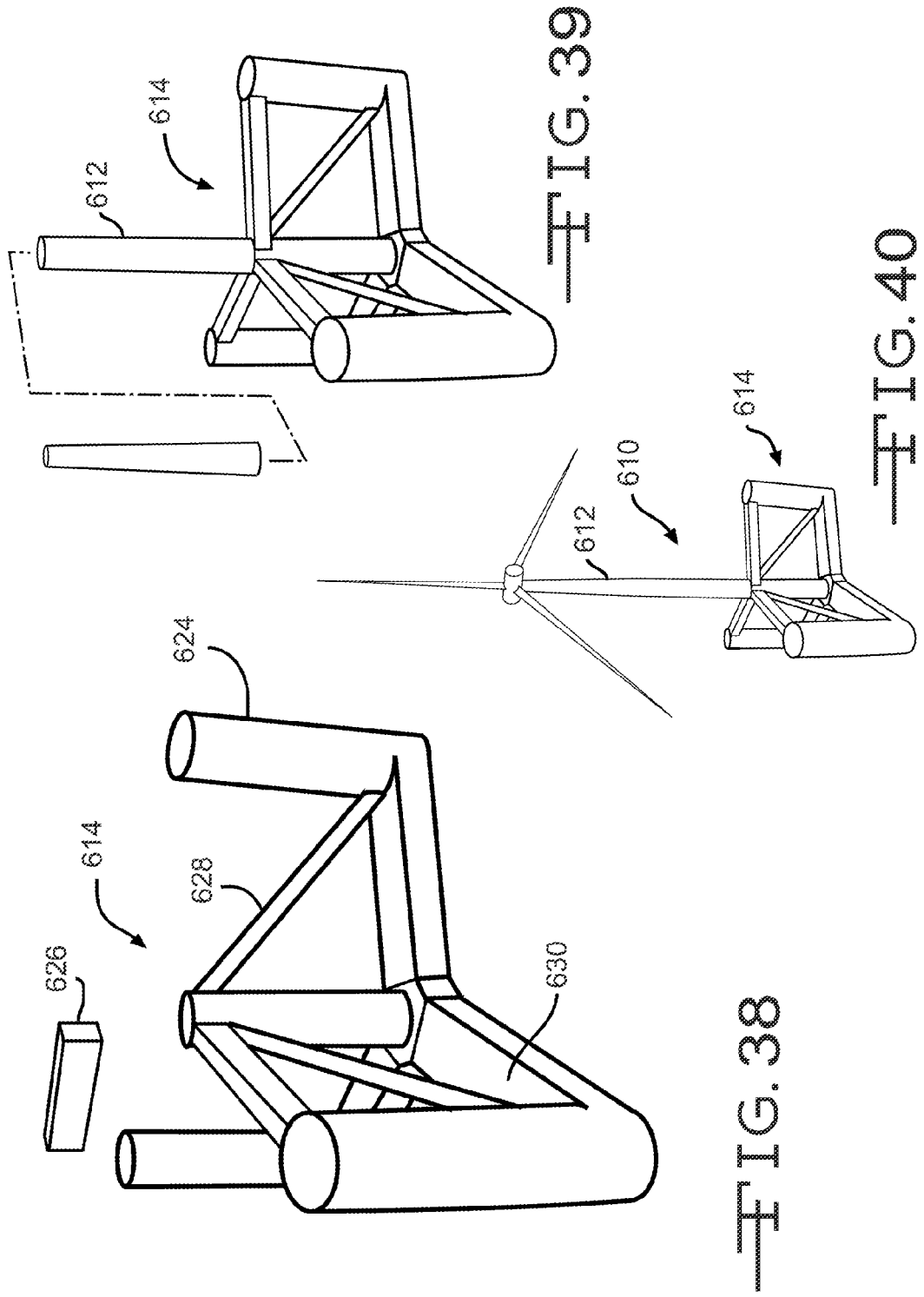

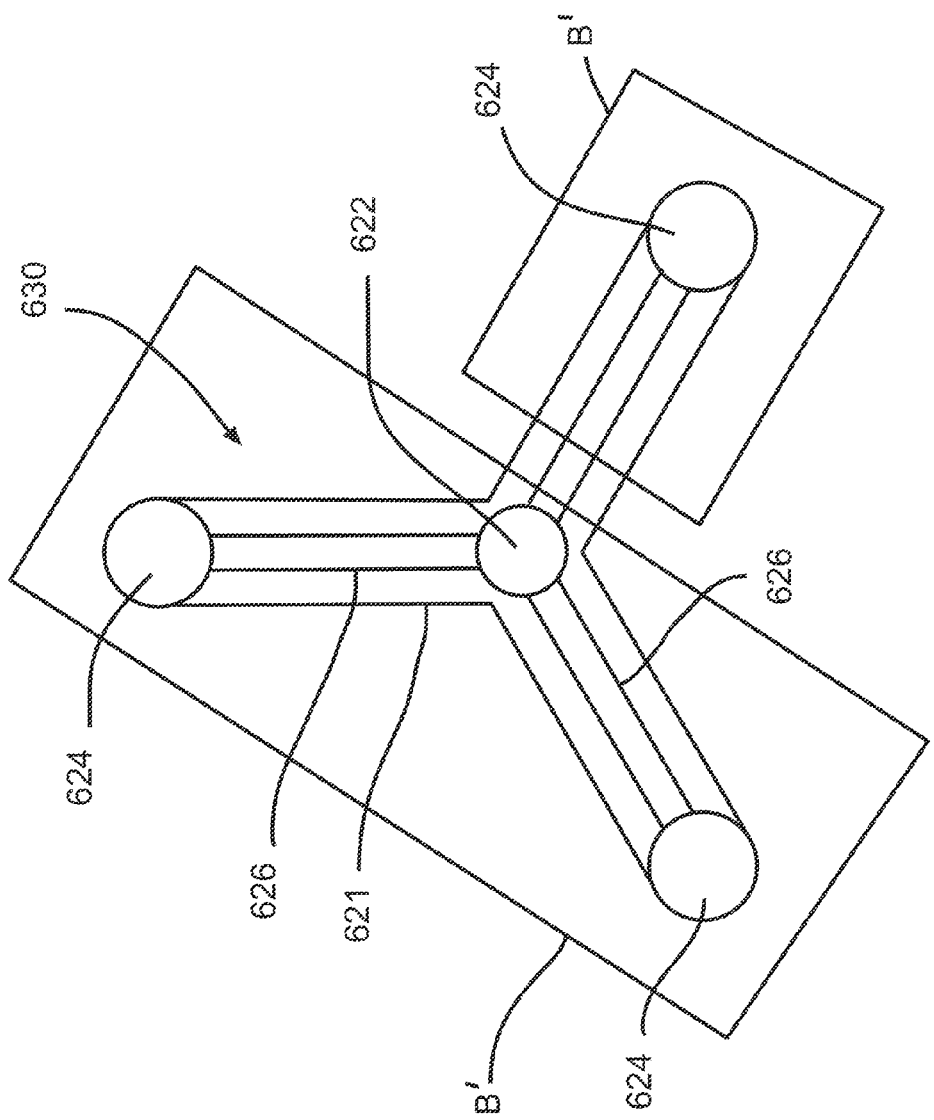

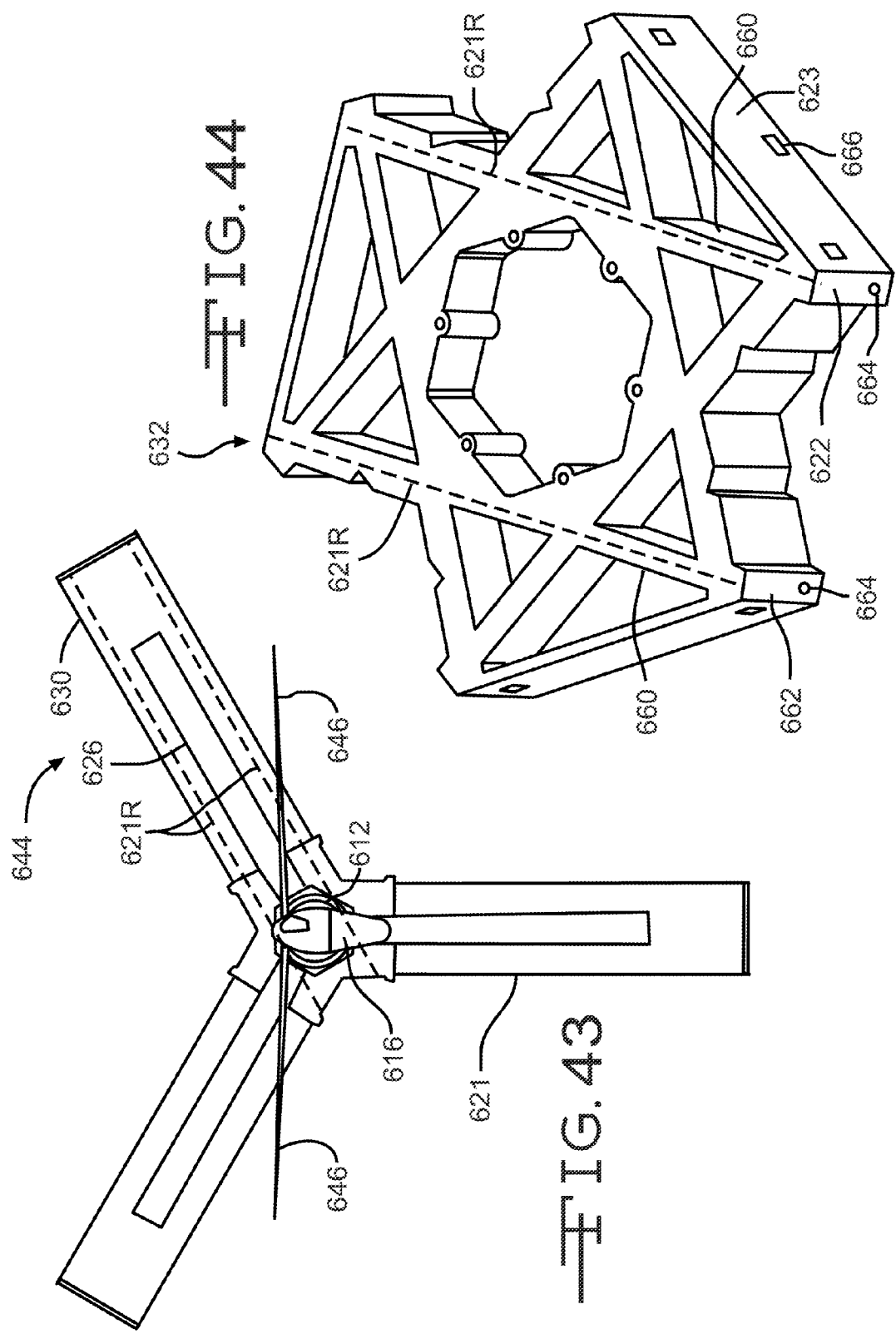

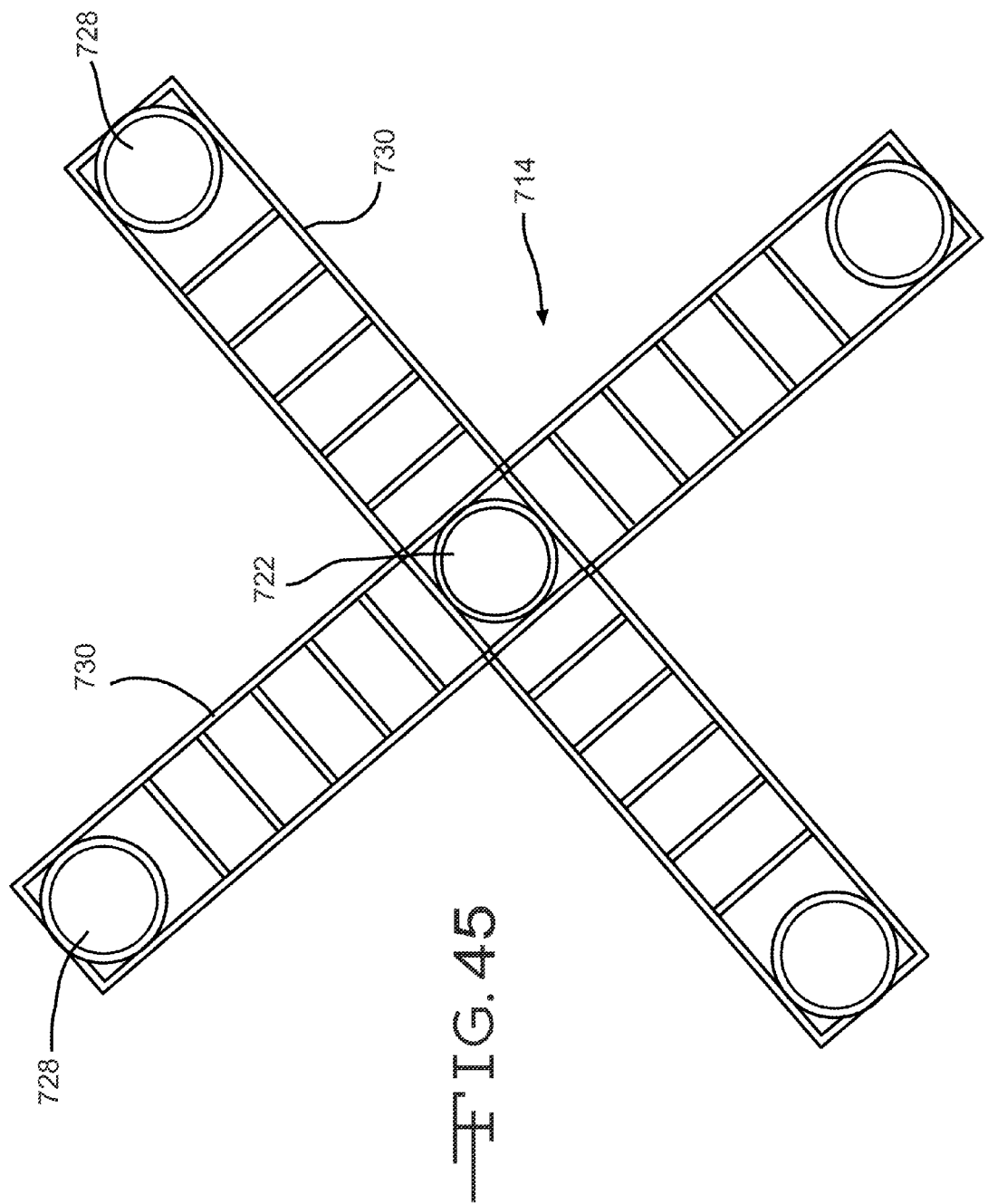

FLOATING WIND TURBINE PLATFORM AND METHOD OF ASSEMBLING

CROSS REFERENCE TO RELATED APPLICATIONS

This application is a Continuation-In-Part of currently pending PCT Application No. PCT/US2011/059335 filed Nov. 4, 2011 which claimed the benefit of U.S. Provisional Application No. 61/410,127, filed Nov. 4, 2010. This application also claims the benefit U.S. Provisional Application No. 61/624,050, filed Apr. 13, 2012 and U.S. Provisional Application No. 61/653,816, filed May 31, 2012. The disclosures of all of the above listed applications are incorporated herein by reference.

BACKGROUND

Various embodiments of a wind turbine platform are described herein. In particular, the embodiments described herein relate to an improved floating wind turbine platform for use in large bodies of water.

Wind turbines for converting wind energy to electrical power are known and provide an alternative energy source for power companies. On land, large groups of wind turbines, often numbering in the hundreds of wind turbines, may be placed together in one geographic area. These large groups of wind turbines can generate undesirably high levels of noise and may be viewed as aesthetically unpleasing. An optimum flow of air may not be available to these land-base wind turbines due to obstacles such as hills, woods, and buildings.

Groups of wind turbines may also be located offshore, but near the coast at locations where water depths allow the wind turbines to be fixedly attached to a foundation on the seabed. Over the ocean, the flow of air to the wind turbines is not likely to be disturbed by the presence of various obstacles (i.e., as hills, woods, and buildings) resulting in higher mean wind speeds and more power. The foundations required to attach wind turbines to the seabed at these near-coast locations are relatively expensive, and can only be accomplished at relatively shallow depths, such as a depth of up to about 25 meters.

The U.S. National Renewable Energy Laboratory has determined that winds off the U.S. Coastline over water having depths of 30 meters or greater have an energy capacity of about 3,200 TWh/yr. This is equivalent to about 90 percent of the total U.S. energy use of about 3,500 TWh/yr. The majority of the offshore wind resource resides between 37 and 93 kilometers offshore where the water is over 60 meters deep. Fixed foundations for wind turbines in such deep water are not likely economically feasible. This limitation has led to the development of floating platforms for wind turbines. Known floating wind turbine platforms are formed from steel and are based on technology developed by the offshore oil and gas industry. There remains a need in the art however, for improved platforms for floating wind turbine applications.

SUMMARY OF THE INVENTION

The present application describes various embodiments of a floating wind turbine platform.

According to this invention there is provided a semisubmersible wind turbine platform capable of floating on a body of water and supporting a wind turbine over a vertical center column, the wind turbine platform, the platform including a vertical center column, and three or more vertical outer columns spaced radially from the center column. Each of the outer columns is connected to the center column with one or more of: (a) a bottom beam extending substantially horizontally between a lower portion of the outer column and a lower portion of the center column, and (b) a top beam extending substantially horizontally between an upper portion of the outer column and an upper portion of the center column. The center column and outer columns are made of concrete and are buoyant with sufficient buoyancy to help support a wind turbine tower. The outer columns are not connected to each other by structurally substantial perimeter linkages.

According to this invention there is also provided a semisubmersible wind turbine platform capable of floating on a body of water and supporting a wind turbine, the wind turbine platform. The platform includes a vertical center column, and three or more vertical outer columns spaced radially from the center column. Each of the outer columns is connected to the center column with (a) a bottom beam extending substantially horizontally between a lower portion of the outer column and a lower portion of the center column, (b) a top beam extending substantially horizontally between an upper portion of the outer column and an upper portion of the center column, and (c) a strut extending between a lower portion of the outer column and an upper portion of the center column. The center column and outer columns are made of concrete and are buoyant with sufficient buoyancy to support a wind turbine tower. The outer columns are not connected to each other by substantial structural perimeter linkages.

According to this invention there is also provided a method of assembling a floating wind turbine platform. The method includes assembling at least three platform wings onto two or more floatation devices on a body of water, the platform wings having a bottom beam and at least a base portion of an outer or center column, with each floatation device supporting one or more platform wings. The barges are brought together arranged about a bottom keystone. Each of the platform wings is attached to the bottom keystone to form the lower portion of a foundation for a wind turbine platform, with the outer columns spaced radially from the bottom keystone, and the outer columns equally circumferentially spaced about the bottom keystone. The floatation devices are removed from under the platform wings such that the foundation floats in the body of water to form a floating wind turbine platform, thereby allowing further construction of the platform in the water.

According to this invention there is also provided a wind generation apparatus including a floating wind turbine platform having a concrete central column, with a top portion of the central column having upwardly oriented anchor bolts embedded in the concrete. A wind turbine tower is mounted onto the platform, the wind turbine tower being made of a fiber-reinforced composite material and having a bottom base plate, with the base plate being bolted to the concrete central column using the anchor bolts.

Various advantages of this invention will become apparent to those skilled in the art from the following detailed description of the preferred embodiment, when read in light of the accompanying drawings.

BRIEF DESCRIPTION OF THE DRAWINGS

FIG. 3A is an elevational view in cross section of a portion of a first alternate embodiment of the connection joint in accordance with this invention.

FIG. 3B is an elevational view in cross section of a portion of a second alternate embodiment of the connection joint in accordance with this invention.

FIG. 3C is an elevational view in cross section of a portion of a third alternate embodiment of the connection joint in accordance with this invention.

FIG. 3D is an elevational view in cross section of a portion of a fourth alternate embodiment of the connection joint in accordance with this invention.

FIG. 3E is an elevational view in cross section of a portion of a fifth alternate embodiment of the connection joint in accordance with this invention.

FIG. 3F is an elevational view in cross section of a portion of a sixth alternate embodiment of the connection joint in accordance with this invention.

FIG. 3G is an elevational view in cross section of a portion of a seventh alternate embodiment of the connection joint in accordance with this invention.

FIG. 3H is an elevational view in cross section of a portion of an eighth alternate embodiment of the connection joint in accordance with this invention.

FIG. 3I is an elevational view in cross section of a portion of a ninth alternate embodiment of the connection joint in accordance with this invention.

FIG. 3J is an elevational view in cross section of a portion of a tenth alternate embodiment of the connection joint in accordance with this invention.

FIG. 3K is an elevational view in cross section of a portion of an eleventh alternate embodiment of the connection joint in accordance with this invention.

FIG. 4 is an elevational view in cross section of a portion of a thirteenth alternate embodiment of the connection joint in accordance with this invention.

FIG. 5 is a perspective view of an alternate embodiment of the tower illustrated in FIG. 1.

FIG. 6 is an elevational view of a first alternate embodiment of the hull illustrated in FIG. 1.

FIG. 7 is a perspective view of a second alternate embodiment of the hull illustrated in FIG. 1.

FIG. 8 is an elevational view of a second embodiment of a floating composite wind turbine platform in accordance with this invention.

FIG. 9 is a top plan view of the hull platform illustrated in FIG. 8.

FIG. 10 is an elevational view of a second embodiment of the floating composite wind turbine platform illustrated in FIG. 8, showing an alternate embodiment of the hull platform.

FIG. 11 is an elevational view of a third embodiment of a floating composite wind turbine platform in accordance with this invention.

FIG. 12 is an elevational view of a fourth embodiment of a floating composite wind turbine platform in accordance with this invention.

FIG. 13 is an elevational view of a fifth embodiment of a floating composite wind turbine platform in accordance with this invention.

FIG. 14 is an elevational view of a sixth embodiment of a floating composite wind turbine platform, showing a pontoon platform in accordance with this invention.

FIG. 15 is an elevational view of the pontoon platform illustrated in FIG. 14, showing a rotating turret.

FIG. 16 is a top plan view of a second embodiment of the pontoon platform illustrated in FIG. 14.

FIG. 17 is a perspective view of a third embodiment of the pontoon platform illustrated in FIG. 14.

FIG. 19 is an elevational view of an alternate embodiment of the floating wind turbine platform illustrated in FIG. 1.

FIG. 20 is an elevational view in cross section of a portion of an alternate embodiment of the tower illustrated in FIG. 1.

FIG. 21 is a perspective view of a fourth embodiment of the pontoon platform illustrated in FIG. 14.

FIG. 22 is a perspective view of a seventh embodiment of a floating wind turbine platform assembled and deployed according to the method of the invention.

FIG. 23A is a plan view of a wing member on a barge.

FIG. 23B is a side elevational view of the wing member on a barge shown in FIG. 23A.

FIG. 24A is a first plan view of a second step of the first phase of the method of assembling and deploying the floating wind turbine platform illustrated in FIG. 1.

FIG. 24B is a plan view of the second step of the first phase of the method of assembling second and deploying the floating wind turbine platform illustrated in FIG. 1, showing construction of the center piece on falsework.

FIG. 24C is a third plan view of the second step of the first phase of the method of assembling and deploying the floating wind turbine platform illustrated in FIG. 1, showing the center piece with the falsework removed.

FIG. 25 is a side elevational view of the portion of the floating wind turbine platform illustrated in FIGS. 24A, 24B, and 24C, showing the barges being removed.

FIG. 26A is a plan view of a first step of the second phase of the method of assembling and deploying the floating wind turbine platform illustrated in FIG. 1, showing the floating foundation near a dock.

FIG. 26B is a first side elevational view of the first step of the second phase of the method of assembling and deploying the floating wind turbine platform illustrated in FIG. 26A, showing the columns being formed.

FIG. 26C is a second side elevational view of the first step of the second phase of the method of assembling and deploying the floating wind turbine platform illustrated in FIGS. 26A and 26B, showing the columns and struts being formed.

FIG. 28A is a first side elevational view of the third step of the second phase of the method of assembling and deploying the floating wind turbine platform illustrated in FIGS. 26A through 27B, showing the outer columns being completed.

FIG. 28B is a second side elevational view of the third step of the second phase of the method of assembling and deploying the floating wind turbine platform illustrated in FIGS. 26A through 27B, showing the outer columns completed.

FIG. 30 is a perspective view of a first step of a second embodiment of the method of assembling and deploying the floating wind turbine platform according to the method of the invention.

FIGS. 31 though 39 are perspective views of subsequent steps of the second embodiment of the method of assembling and deploying the floating wind turbine platform.

FIG. 40 is a perspective view of a final step of the second embodiment of the method of assembling and deploying the floating wind turbine platform.

FIG. 41 is a plan view of three wing members supported by two barges.

FIG. 43 in a plan view of a completed wind generating device.

FIG. 44 is a perspective view of a bottom keystone.

FIG. 45 is a cross-sectional plan view of the lower portion of a foundation having four wings.

DETAILED DESCRIPTION

The present invention will now be described with occasional reference to the illustrated embodiments of the invention. This invention may, however, be embodied in different forms and should not be construed as limited to the embodiments set forth herein, nor in any order of preference. Rather, these embodiments are provided so that this disclosure will be more thorough, and will convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

The embodiments of the invention disclosed below generally provide improvements to various types of floating wind turbine platforms, such as spar buoy type platforms, tension leg type platforms, and semi-submersible type platforms. The invention includes improvements to various types of floating wind turbine platforms, including constructing components of the floating wind turbine platforms with materials selected to reduce the overall cost of the floating wind turbine platforms.

Figures 1, 1A:
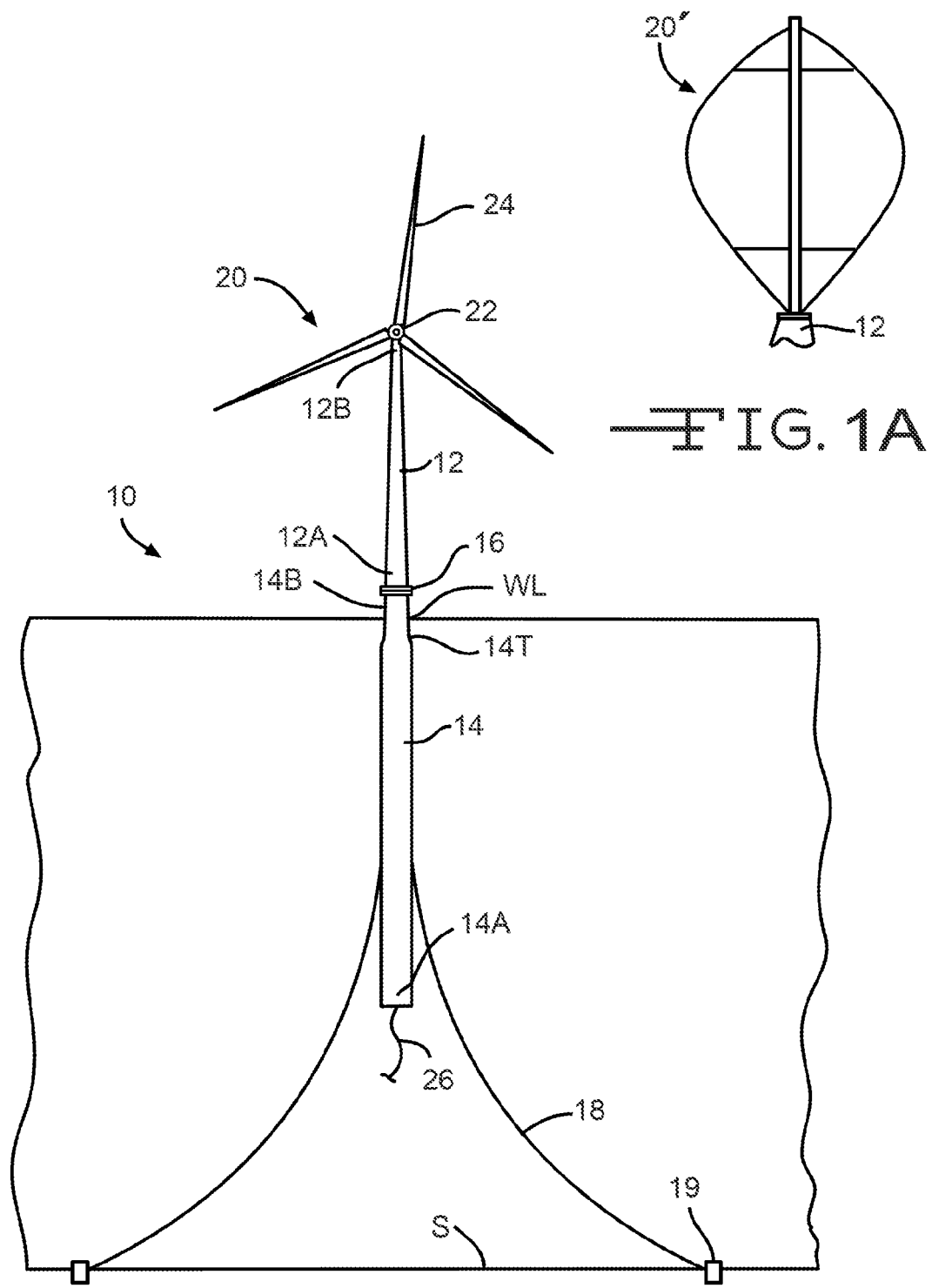
FIG. 1 is an elevational view of a spar buoy type floating wind turbine platform in accordance with this invention.
FIG. 1A is an enlarged view of a portion of an alternate embodiment of the floating wind turbine platform illustrated in FIG. 1, showing a vertical-axis wind turbine.

Referring to the drawings, particularly to FIG. 1, a first embodiment of a floating composite wind turbine platform 10 is shown anchored to the seabed S. The illustrated floating wind turbine platform 10 is a ballast stabilized, spar buoy type platform and includes a tower 12 attached to a hull 14 at a connection joint 16. Mooring lines 18 are attached to the hull 14 and further anchored to the seabed S by anchors 19. A wind turbine 20 is mounted to the tower 12.

A spar buoy type platform maintains its stability afloat by keeping its center of gravity below its center of buoyancy. This relationship of the center of gravity being below the center of buoyancy may be achieved by filling a heavy long tube or hull with ballast comprising water and dense material such as rocks.

In the embodiments illustrated herein, the wind turbine 20 is a horizontal-axis wind turbine. Alternatively, the wind turbine may be a vertical-axis wind turbine, such as shown at 20' in FIG. 1A. The size of the turbine 20 will vary based on the wind conditions at the location where the floating wind turbine platform 10 is anchored and the desired power output. For example, the turbine 20 may have an output of about 5 MW. Alternatively, the turbine 20 may have an output within the range of from about 1 MW to about 10 MW.

The wind turbine 20 includes a rotatable hub 22. At least one rotor blade 24 is coupled to and extends outward from the hub 22. The hub 22 is rotatably coupled to an electric generator (not shown). The electric generator may be coupled via a transformer (not shown) and an underwater power cable 26 to a power grid (not shown). In the illustrated embodiment, the rotor has three rotor blades 24. In other embodiments, the rotor may have more or less than three rotor blades 24.

In the illustrated embodiment, the tower 12 is formed as a tube and is fabricated from fiber reinforced polymer (FRP) composite material. Non-limiting examples of other suitable composite material include glass and carbon FRP. The tower may also be formed from a composite laminate material as shown at 312 in FIG. 20. The illustrated tower 312 includes a first FRP composite layer 314, a second FRP composite layer 316, and a foam core 318. Alternatively, the tower 12 may be formed from concrete or steel in the same manner as the hull 14, described in detail below. Additionally, the tower 12 may be formed from steel.

Figure 2:
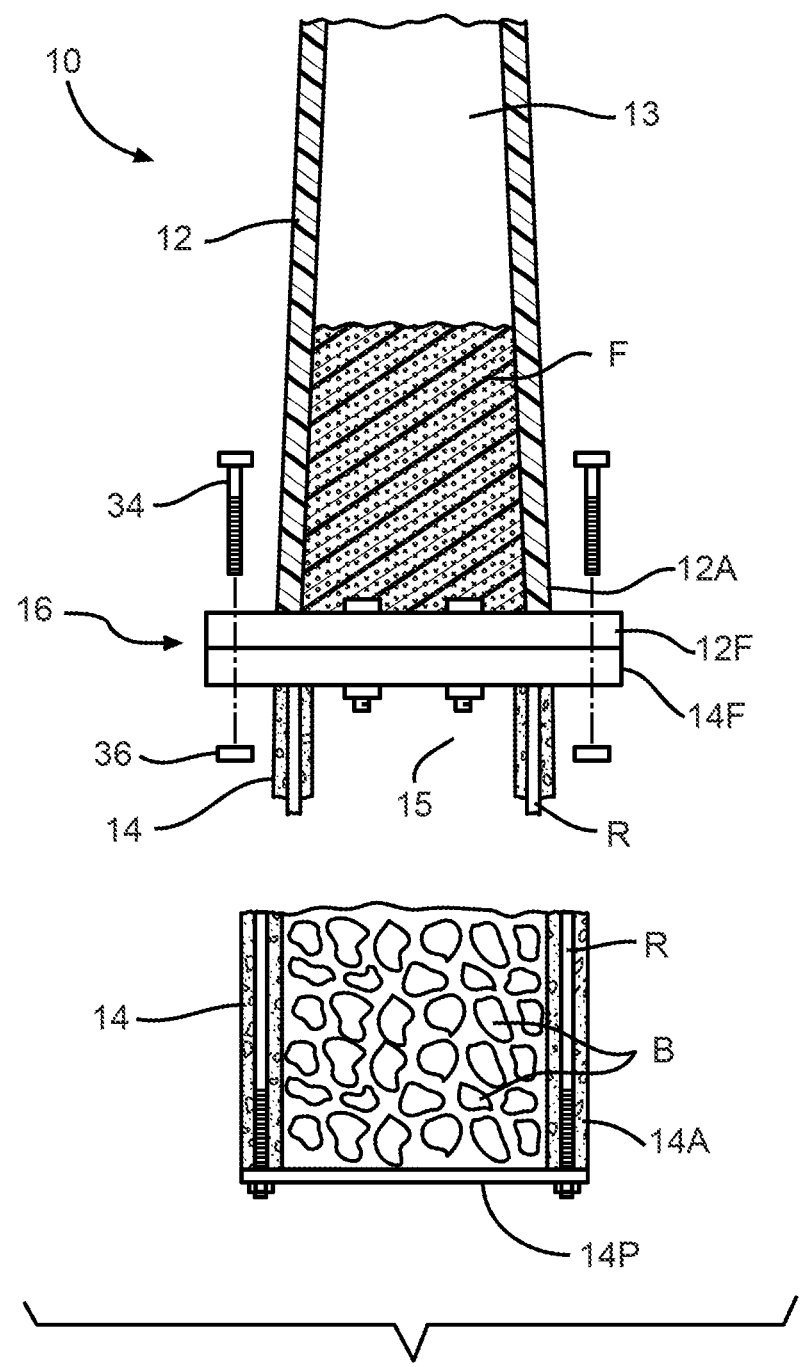
FIG. 2 is an enlarged view, partially in section, of the floating wind turbine platform illustrated in FIG. 1 partially spaced apart and showing one embodiment of a connection joint between the tower and the hull.

The interior of the tower 12 defines a cavity 13 between a first end 12A (lower end when viewing FIG. 1) and a second end 12B (upper end when viewing FIG. 1). As best shown in FIG. 2, a radially outwardly extending flange 12F is formed at the first end 12A of the tower 12, as best shown in FIG. 1A. The radially extending flange 12F defines a portion of the connection joint 16.

The cavity 13 of the tower 12 may be filled with foam or concrete for added rigidity. In the illustrated embodiment, foam F is shown filling a portion of the cavity 13 of the tower 12. Alternatively, the foam F, or concrete (not shown), may fill the entire cavity 13 of the tower 12 from the first end 12A to the second end 12B. One non-limiting example of a suitable foam includes polyurethane. Sufficiently rigid material other than foam and concrete may also be used to fill or partially fill the cavity 13 of the tower 12.

Advantageously, the tower 12 formed from composite material as described above will have reduced mass above a waterline WL relative to a conventional steel tower. Because the FRP composite tower 12 has reduced mass, the mass of the hull 14 (e.g. self-weight and ballast, described in detail below) required below the water line WL to maintain stability of the floating wind turbine platform 10 may also be reduced. This will reduce the overall cost of the wind generating device. As used herein, waterline is defined as the approximate line where the floating wind turbine platform 10 meets the surface of the water.

The tower 12 may have any suitable outside diameter and height. In the illustrated embodiment, the outside diameter of the tower 12 tapers from a diameter of about 6 meters at the first end 12A to a diameter of about 4 meters at the second end 12B. Alternatively, the outside diameter of the tower 12 may be any other desired diameter, such as within the range of from about 3 meters to about 12 meters. In the illustrated embodiment, the height of the tower 12 is about 90 meters. Alternatively, the height of the tower 12 may be within the range of from about 50 meters to about 140 meters.

In the illustrated embodiment, the hull 14 is formed as a tube and is fabricated from reinforced concrete. The interior of the hull 14 defines a cavity 15 between a first end 14A (lower end when viewing FIG. 1) and a second end 14B (upper end when viewing FIG. 1). Any desired process may be used to manufacture the hull 14, such as a spun concrete process or conventional concrete forms. Alternatively, other processes such as those used in the precast concrete industry may also be used. The hull 14 may be reinforced with any desired reinforcement member R. Non-limiting examples of suitable reinforcement members R include high tensile steel cable and high tensile steel reinforcement bars or REBAR. Alternatively, the hull 14 may be formed from FRP composite in the same manner as the tower 12, described above. Additionally, the hull 14 may be formed from steel.

The hull 14 may have any suitable outside diameter and height. In the illustrated embodiment, the hull 14 has a first outside diameter D1 and a second outside diameter D2 which is smaller that the first outside diameter D1. The portion of the hull 14 having the first outside diameter D1 extends from the first end 14A to a tapered transition section 14T. The portion of the hull 14 having the second outside diameter D2 extends from the transition section 14T to the second end 14B. In the illustrated embodiment, the first outside diameter D1 is about 8 meters and the second outside diameter D2 is about 6 meters. Alternatively, the first and second outside diameters D1 and D2 of the hull 14 may be any other desired diameters, such as within the range of from about 4 meters to about 12 meters and within the range of from about 4.5 meters to about 13 meters, respectively. Additionally, the hull 14 may have a uniform outside diameter. In the illustrated embodiment, the height of the hull 14 is about 120 meters. Alternatively, the height of the hull 14 may be greater than or less than 120 meters, such as, for example, within the range of from about 50 meters to about 150 meters.

A radially outwardly extending flange 14F is formed at the second end 14B of the hull 14, as best shown in FIG. 2. The radially extending flange 14F defines a portion of the connection joint 16. A first end 14A of the hull 14 is closed by a plate 14P. The plate 14P may be formed from any suitable substantially rigid material such as steel. Alternatively, the first end 14A of the hull 14 may be closed by a plate, which can be formed from any suitable substantially rigid material such as steel.

In the illustrated embodiment, the connection joint 16 is formed by connecting the flange 12F and the flange 14F. In the embodiment illustrated in FIG. 2, the flanges 12F and 14F are connected by bolts 34 and nuts 36. Alternatively, the flanges 12F and 14F may be connected by any other desired fasteners, such as rivets, adhesives, or by welding.

It will be understood that the flange 12F of the tower 12 and the flange 14F of the hull 14 may be formed as radially inwardly extending flanges such that the fasteners (e.g. the bolts 34 and nuts 36) are installed within the tower and hull cavities, 13 and 15 respectively.

As shown in FIG. 2, the cavity 15 of the hull 14 may be filled with ballast B to stabilize the floating wind turbine platform 10. In the illustrated embodiment, this ballast B is shown filling a portion of the cavity 15 of the hull 14, such as a lower ⅓ of the cavity 15. Alternatively, the ballast B may fill any other desired portion of the cavity 15 of the hull 14 from the first end 14A to the second end 14B. In the illustrated embodiment, the ballast B is shown as rocks. Other non-limiting examples of suitable ballast material include water, scrap steel, copper ore, and other dense ores. Other sufficiently dense material may also be used as ballast to fill or partially fill the cavity 15 of the hull 14.

The hull 14 may pre-cast at a location distant from the location where the floating wind turbine platform 10 will be deployed. During manufacture of the hull 14, the reinforcement members R may be pre-tensioned. Alternatively, during manufacture of the hull 14, the reinforcement members R may be post-tensioned. Advantageously, the reinforced concrete hull 14 described above is relatively heavy and may require less ballast B than conventional steel hulls.

A first end (upper end when viewing FIG. 1) of each mooring line 18 is attached to the hull 14. A second end (lower end when viewing FIG. 1) of each mooring line 18 is attached or anchored to the seabed S by an anchor 19, such as a suction anchor. Alternatively, other types of anchors may be used, such as a drag anchor, gravity anchor, or drilled anchor. In the illustrated embodiment, the mooring lines 18 are configured as catenary moorings. The mooring lines 18 may be formed from any desired material. Non-limiting examples of suitable mooring line material include steel rope or cable, steel chain segments, and synthetic rope such as nylon. It will be understood that when the mooring lines 18 are slack as shown, the catenary curve formed by the mooring lines presents a lower angle of pull on the anchor 19 than would be the case if mooring lines 18 were nearly straight. This enhances the performance of the anchor 19.

Referring to FIG. 19, a second embodiment of a floating composite wind turbine platform is shown at 10'. The illustrated floating wind turbine platform 10' is substantially similar to the floating composite wind turbine platform shown at 10, but the tower 12 and the hull 14 are formed as a one-piece tower/hull member 11. In this embodiment, the connection joint 16 is not required. The one-piece tower/hull member 11 may be formed from FRP composite in the same manner as the tower 12, described in detail above. Alternatively, the one-piece tower/hull member 11 may be formed from reinforced concrete in the same manner as the hull 14, described in detail above.

The interior of the tower/hull member 11 defines an elongated cavity 17 within the tower/hull member 11. In the illustrated embodiment, a wall 38 extends transversely within the cavity 17 and divides the cavity 17 into a tower cavity portion 13' and a hull cavity portion 15'. At least a portion of the tower cavity portion 13' may be filled with foam or concrete (not shown in FIG. 19) for added rigidity as described above. At least a portion of the hull cavity portion 15' may be filled with ballast (not shown in FIG. 19) to stabilize the floating wind turbine platform 10' as described above.

Figure 3L:
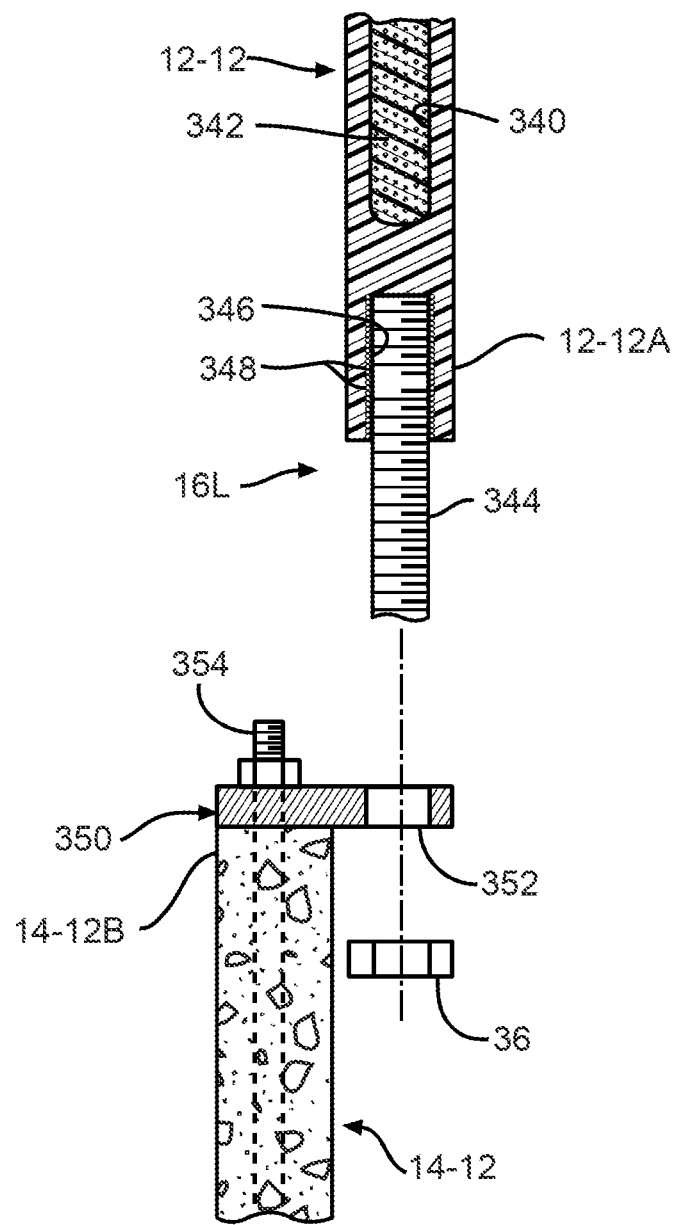
FIG. 3L is an elevational view in cross section of a portion of a twelfth alternate embodiment of the connection joint in accordance with this invention.

Referring to FIGS. 3A through 3L, alternate embodiments of the connection joint are shown at 16A though 16H respectively. As shown in FIG. 3A, a portion of a first alternate embodiment of the connection joint is shown at 16A. In the illustrated embodiment, the tower 12-1 and the hull 14-1 are formed from FRP composite as described above. Other materials can be used. The connection joint 16A includes a tower 12-1 and a hull 14-1. Each of a pair of collar members 12-1C includes a cylindrical collar portion 110 and a flange portion 112. The collar members 12-1C may be integrally formed with the FRP composite tower 12-1 and hull 14-1, respectively. In the embodiment illustrated in FIG. 3A, the flange portions 112 are connected by bolts 34 and nuts 36. Alternatively, the flange portions 112 may be connected by any other desired fasteners, such as rivets, or by welding.

As shown in FIG. 3B, a portion of a second alternate embodiment of the connection joint is shown at 16B. In the illustrated embodiment, the tower 12-2 and the hull 14-2 are formed from steel as described above. A radially extending flange 12-2F is formed at the first end 12-2A of the tower 12-2, and a radially extending flange 14-2F is formed at the second end 14-2B of the hull 14-2. The radially extending flange 12F defines a portion of the connection joint 16. In the embodiment illustrated in FIG. 3B, the flanges 12-2F and 14-2F are connected by bolts 34 and nuts 36. Alternatively, the flanges 12-2F and 14-2F may be connected by any other desired fasteners or by welding.

As shown in FIG. 3C, a portion of a third alternate embodiment of the connection joint is shown at 16C. In the illustrated embodiment, the connection joint 16C is substantially identical to the connection joint 16B, except that the tower 12-3 and the hull 14-3 are formed from FRP composite. In the embodiment illustrated in FIG. 3C, the flanges 12-3F and 14-3F are connected by bolts 34 and nuts 36. Alternatively, the flanges 12-3F and 14-3F may be connected by any other desired fasteners or by welding.

As shown in FIG. 3D, a portion of a fourth alternate embodiment of the connection joint is shown at 16D. In the illustrated embodiment, the tower 12-4 and the hull 14-4 are formed from FRP composite as described above. Each of a pair of collar members 12-4C includes a cylindrical collar portion 114 and a flange portion 116. The collar portion 114 of each of the pair of collar members 12-4C is inserted into a notch formed in the first end 12-4A of the tower 12-4 and in the second end 14-4B of the hull 14-4, respectively. A layer of adhesive may be applied between the collar members 12-4C and each of the tower 12-4 and the hull 14-4. In the embodiment illustrated in FIG. 3D, the flange portions 116 are connected by bolts 34 and nuts 36. Alternatively, the flange portions 116 may be connected by any other desired fasteners or by welding.

As shown in FIG. 3E, a portion of a fifth alternate embodiment of the connection joint is shown at 16E. In the illustrated embodiment, the tower 12-5 and the hull 14-5 are formed from FRP composite as described above. Each of a pair of the collar members 12-4C include the cylindrical collar portion 114 and the flange portion 116. The collar portion 114 of each of the pair of collar members 12-4C is inserted into a notch formed in the first end 12-5A of the tower 12-5 and in the second end 14-5B of the hull 14-5, respectively. A layer of adhesive may be applied between the collar members 12-4C and each of the tower 12-5 and the hull 14-5. In the embodiment illustrated in FIG. 3E, the flange portions 116 are connected by bolts 34 and nuts 36. Alternatively, the flange portions 116 may be connected by any other desired fasteners or by welding.

As shown in FIG. 3F, a portion of a sixth alternate embodiment of the connection joint is shown at 16F. In the illustrated embodiment, the tower 12-6 and the hull 14-6 are formed from FRP composite as described above. A notch 12-6N is formed in the first end 12-6A of the tower 12-6 and a notch 14-6N is formed in the second end 14-6B of the hull 14-6. The notch 12-6N of the first end 12-6A of the tower 12-6 is inserted into the notch 14-6N of the second end 14-6B of the hull 14-6 to define a lap joint.

As shown in FIG. 3G, a portion of a seventh alternate embodiment of the connection joint is shown at 16G. In the illustrated embodiment, the connection joint 16G is substantially identical to the connection joint 16F, except that a layer of adhesive is applied between the notches 12-7N and 14-7N.

As shown in FIG. 3H, a portion of an eighth alternate embodiment of the connection joint is shown at 16H. In the illustrated embodiment, the connection joint 16G is substantially identical to the connection joint 16F, except that lap joint is reinforced by a bolt 34 which extends through the lap joint and is fastened by a nut 36.

As shown in FIG. 3I, a portion of a ninth alternate embodiment of the connection joint is shown at 16A. In the illustrated embodiment, the tower 12-9 is formed from the composite laminate material as also shown in FIG. 20. The illustrated tower 12-9 includes the first FRP composite layer 314, the second FRP composite layer 316, and the foam core 318. The hull is not shown in FIG. 3I, but may be any of the embodiments of the hull described herein. A collar member 12-9C includes parallel cylindrical collar portions 320 and a flange portion 324. A channel 322 is defined between the collar portions 320. The collar member 12-9C is configured to be connected to another collar, such as the collar 12-1C. A layer of adhesive may be applied between the collar portions 320 and the foam core 318, and between the collar portions 320 and the first and second FRP composite layers 314 and 316, respectively. In the embodiment illustrated in FIG. 3I, the collar 12-9C and the collar 12-1C are connected by bolts 34 and nuts 36. Alternatively, the flange portions 112 may be connected by any other desired fasteners, such as rivets, or by welding.

As shown in FIG. 3J, a portion of a tenth alternate embodiment of the connection joint is shown at 16J. In the illustrated embodiment, the tower 12-10 is formed from FRP composite as described above. The hull 14-10 is formed from reinforced concrete, as described above. A first end 12-10A of the tower 12-10 is embedded in and bonded to the cured concrete of the second end 14-10B of the hull 14-10.

As shown in FIG. 3K, a portion of an eleventh alternate embodiment of the connection joint is shown at 16K. In the illustrated embodiment, the tower 12-11 and the hull 14-11 are formed from composite laminate material as also shown in FIGS. 20 3I. The illustrated tower 12-11 includes a first FRP composite layer 330, a second FRP composite layer 332, and a foam core 334. The first end 12-11A of the tower 12-11 and the second end 14-11B of the hull 14-11 are closed by a third FRP composite layer 336. A layer of adhesive may be applied between the third FRP composite layers 336.

As shown in FIG. 3L, a portion of a twelfth alternate embodiment of the connection joint is shown at 16L. In the illustrated embodiment, the tower 12-12 is formed from FRP composite as described above. If desired, an annular cavity 340 may be formed in the tower 12-12 and filled with foam 342. Alternatively, the tower 12-12 may be formed from the composite laminate material as also shown in FIG. 20. A plurality of threaded fasteners 344 are attached within fastener cavities 346 in the first end 12-12A of the tower. The threaded fasteners 344 may be embedded in the FRP composite material of the first end 12-12A of the tower 12-12 during manufacture of the tower 12-12. If desired, reinforcing fibers 348 may be wrapped around the threaded fasteners 344 to strengthen the bond between the FRP composite and the threaded fasteners.

The hull 14-12 is formed from reinforced concrete, as described above. An annular plate 350 is attached to the second end 14-12B of the hull 14-12 by a bolt 354. Alternatively, the annular plate 350 may be attached to the second end 14-12B of the hull 14-12 by a cable (not shown), or any other means. The plate 350 includes a plurality of holes 352 through which the bolts 344 extend. Nuts 36 are attached to the bolts 344. Alternatively, the hull may be any of the hull embodiments illustrated in FIGS. 3A through 3E.

Referring now to FIG. 4, a thirteenth embodiment of the connection joint is shown at 122. In the illustrated embodiment, the tower 124 is formed from FRP composite, and the hull 126 is formed from reinforced concrete, as described above. The tower 124 is substantially tubular and includes a cavity 125. The hull 126 is also substantially tubular and includes an outer wall 126W at the second end 126B of the hull 126. The first end 124A of the tower 124 is inserted into the second end 126B of the hull 126. The concrete that forms the outer wall 126W extends inwardly and upwardly into the cavity 125 of the tower 124 to define a rigidity member 130. When cured, the rigidity member 130 provides added rigidity to the tower 124.

The connection joint 122 may be formed by inserting the first end 124A of the tower 124 into a hull form (not shown) which defines the shape of the second end 126B of the hull 126 to be formed. Concrete may be poured (as indicated by the arrows 128) through the cavity 125 of the tower 124 and into the hull form to form the outer wall 126W of the second end 126B of the hull 126. When the concrete is cured, the concrete of the rigidity member 130 is contiguous with the concrete of the outer wall 126W of the second end 126B of the hull 126, thus the first end 124A of the tower 124 is embedded in and bonded to the second end 126B of the hull 126. Additionally, an outside surface of the first end 124A may be textured such that it interlocks and bonds with the concrete of the outer wall 126W of the second end 126B of the hull 126, in the region identified by the numeral 132 in FIG. 4.

FIG. 5 illustrates an alternate embodiment of the tower 212. The illustrated tower 212 is formed from a plurality of rings or sections 216. The tower sections 216 are connected to each other at connection joints 218. The connection joints 218 may be any of the connection joints described and illustrated in FIGS. 2, 3A through 3L, and 4. As described above regarding the tower 12, the tower sections may 216 may be fabricated from FRP composite material, reinforced concrete, or steel. The tower 212 may also have any suitable outside diameter and height. The tower sections 216 may also be connected by a post-tensioning cable in the same manner as described below regarding the hull sections 220.

Figure 6B:
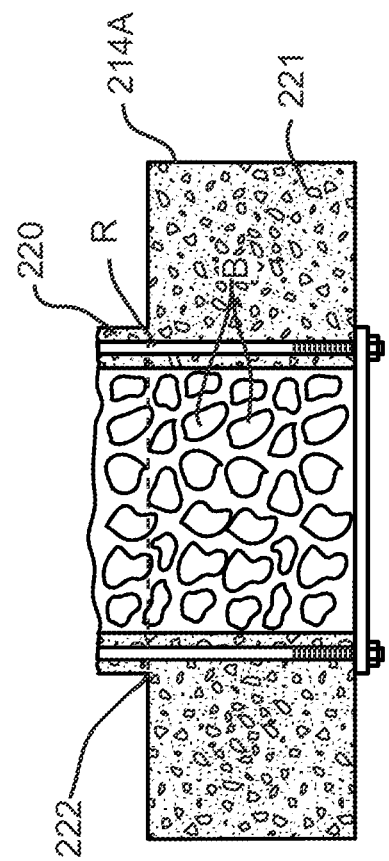
FIG. 6B is an enlarged elevational view in cross section of an alternate embodiment of the first end of the hull illustrated in FIG. 6.
Figure 6A:
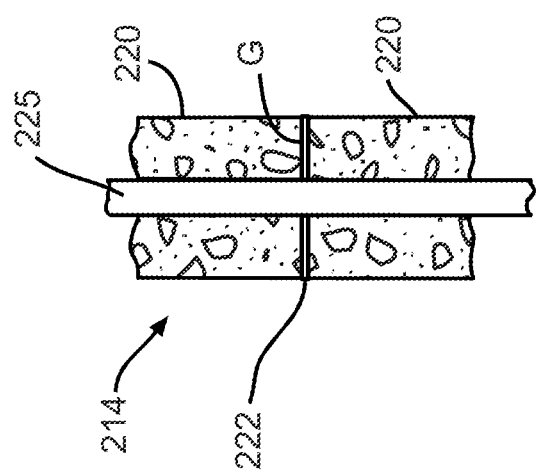
FIG. 6A is an enlarged elevational view in cross section of the connection joint illustrated in FIG. 6.

FIG. 6 illustrates a first alternate embodiment of the hull 214. The illustrated hull 214 is formed from a plurality of rings or sections 220. The hull sections 220 are connected to each other at connection joints 222. The connection joints 222 may be any of the connection joints described and illustrated in FIGS. 2, 3A through 3L, and 4. As described above regarding the hull 14, the hull sections 216 may be fabricated from FRP composite material, reinforced concrete, or steel. The hull 214 may also have any suitable outside diameter and height. Alternatively, as best shown in FIG. 6A, the hull sections 220 may be connected by a post-tensioning cable 225 running through some or all of the hull sections 220 thereby clamping the hull sections 220 together and defining the hull 214. A sealing member, such as a gasket G, may be disposed between the hull sections 220 to seal the connection joints 222. Non-limiting examples of suitable gasket material include neoprene, caulking, rubber, and other elastomers.

Referring to FIG. 6B, a lower most hull section 221 at the first end 214A of the hull 214 may be formed from concrete and have an outside diameter significantly larger than an outside diameter of the sections 220. The hull section 221 would thereby have a greater mass than a hull section 220, and provide additional ballast to the hull 214.

Referring to FIG. 7, a second alternate embodiment of the hull is illustrated at 28. The hull 28 includes a plurality of hollow tube members 30. In the illustrated embodiment, the tube members 30 are connected by elongated webs 32. The tube members 30 may be fabricated from FRP composite material and each tube member 30 may be filled or partially filled with foam F or concrete for added rigidity, as described above. Alternatively, the hollow tube members 30 may be formed from concrete in the same manner as the hull 14 described above. In the illustrated embodiment, the hull 28 has six hollow tube members 30. In other embodiments, the hull 28 may have more or less than six hollow tube members 30.

Referring now to FIG. 8, a second embodiment of a floating composite wind turbine platform 40 is shown anchored to the seabed S. The illustrated floating wind turbine platform 40 is a mooring line stabilized, tension leg type platform and includes the tower 12 attached to a hull platform 44 at a connection joint 46. Mooring lines 48 are attached to the platform 44 and further anchored via anchors 19 to the seabed S. The wind turbine 20 is mounted to the tower 42.

A tension leg type platform maintains its stability afloat through a buoyant hull or platform anchored to the seabed by taut mooring lines. This type of floating wind turbine platform may be substantially lighter than other types of floating wind turbine platforms because the center of gravity does not have to be below the center of buoyancy.

Referring to the embodiment illustrated in FIGS. 8 and 9, the platform 44 includes a central portion 50 and legs 52 extending radially outwardly of the central portion 50. A vertically extending portion 54 extends outwardly from the central portion 50 (upwardly when viewing FIG. 8). The interior of the platform 44 defines a cavity substantially filled with air for buoyancy. In the illustrated embodiment, the platform 44 has three legs 52. In other embodiments, the platform 44 may have more or less than three legs 52.

The platform 44 may be formed from reinforced concrete as described above. Alternatively, the platform 44 may be formed from FRP composite in the same manner as the tower 12, described above. Additionally, the platform 44 may be formed from steel.

The platform 44 may have any desired dimensions. In the illustrated embodiment for example, each of the legs 52 of the platform 44 has a length of about 45 meters when measured from a center C of the platform 44. Alternatively, each of the legs 52 may have a length within the range of from about 30 meters to about 100 meters when measured from the center C of the platform 44.

A radially extending flange 44F is formed at a first end of the vertically extending portion 54 (upper end when viewing FIG. 8). The radially extending flange 44F defines a portion of the connection joint 46.

In the illustrated embodiment, the connection joint 46 is formed by connecting the flange 12F of the tower 12 and the flange 44F. The flanges 12F and 44F may be connected by bolts 34 and nuts 36 as shown in FIG. 2 and described above. Alternatively, the flanges 12F and 44F may be connected by any other desired fasteners, such as rivets, adhesive, or by welding. Additionally, the connection joint 46 may be any of the connection joints described and illustrated in FIGS. 2, 3A through 3L, and 4.

A first end (upper end when viewing FIG. 8) of each mooring line 48 is attached to a distal end of each leg 52 of the platform 44. A second end (lower end when viewing FIG. 8) of each mooring line 48 is attached or anchored to the seabed S by an anchor 19, as described above. In the illustrated embodiment, the mooring lines 48 are configured as taut moorings. The mooring lines 48 may be formed from any desired material. Non-limiting examples of suitable mooring line material include steel rope or cable, steel chain segments, synthetic rope such as nylon rope, and composite tendons such as FRP tendons. As shown in FIG. 8, a lower portion of the tower 12 (i.e., the first end 12A) is below the water line WL.

Referring to FIG. 10, a second embodiment of the mooring line stabilized, tension leg type platform is shown at 40'. The illustrated floating wind turbine platform 40' includes the tower 12' attached to a hull platform 44' at a connection joint 46'. Mooring lines 48 are attached to the hull platform 44 and further anchored to the seabed (not shown in FIG. 10). The wind turbine 20 is mounted to the tower 12'. The illustrated hull platform 44' is substantially similar to the hull platform 44, but the vertically extending portion 54' is longer than the vertically extending portion 54. In the illustrated embodiment, the vertically extending portion 54' is configured such that a first end 54A', and its attached flange 44F is above the waterline WL. In the illustrated embodiment, the vertically extending portion 54' has a length of about 40 meters. Alternatively, the vertically extending portion 54' may have a length within the range of from about 5 meters to about 50 meters.

Referring now to FIG. 11, a third embodiment of a floating composite wind turbine platform 60 is shown anchored to the seabed S. The illustrated floating wind turbine platform 60 is similar to the mooring line stabilized, tension leg type platform 40 illustrated in FIG. 8 and includes a tower 62 attached to the hull platform 44 at a connection joint 66. Mooring lines 48 are attached to the hull platform 44 and further anchored via anchors 19 to the seabed S. The wind turbine 20 is mounted to the tower 62. Cable stays 64 are attached to the hull platform 44 and further attached to the tower 62.

In the illustrated embodiment, the tower 62 is formed as a tube and is fabricated from fiber reinforced polymer (FRP) composite material. Non-limiting examples of suitable FRP composite material include glass and carbon FRP. Alternatively, the tower 62 may be formed from concrete or from steel, as described above.

Because the cable stays 64 reduce bending stress in the tower 62, the tower 62 can be of a smaller diameter than the tower 12 illustrated in FIG. 8. For example, the tower 62 may have any suitable outside diameter and height. In the illustrated embodiment, the outside diameter of the tower 62 is about 4 meters. Alternatively, the outside diameter of the tower 62 may be any other desired diameter, such as within the range of from about 3 meters to about 10 meters. In the illustrated embodiment, the height of the tower 62 is about 90 meters. Alternatively, the height of the tower 62 may be within the range of from about 40 meters to about 150 meters.

The interior of the tower 62 also defines a cavity (not shown in FIG. 11) between the first end 62A and the second end 62B. A radially extending flange 62F is formed at the first end 62A of the tower 62, as best shown in FIG. 4. The radially extending flange 62F defines a portion of the connection joint 66.

In the illustrated embodiment, the connection joint 66 is formed by connecting the flange 62F and the flange 44F. The flanges 62F and 44F may be connected by bolts 34 and nuts 36 as shown in FIG. 2 and described above. Alternatively, the flanges 62F and 44F may be connected by any other desired fasteners, such as rivets, adhesive, grout, or by welding. Additionally, the connection joint 66 may be any of the connection joints described and illustrated in FIGS. 2, 3A through 3L, and 4.

A first end (lower end when viewing FIG. 11) of each cable stay 64 is attached to a distal end of each leg 52 of the hull platform 44. A second end (upper end when viewing FIG. 11) of each cable stay 64 is attached to a mid-point 62M of the tower 62. The cable stays 64 support and reduce bending stress in the tower 62. The cable stays 64 may be formed from any desired material. Non-limiting examples of suitable mooring line material include steel rope or cable, steel chain segments, synthetic rope such as nylon rope, and composite tendons such as FRP tendons.

Referring now to FIG. 12, a fourth embodiment of a floating composite wind turbine platform 70 is shown anchored to the seabed S. The illustrated floating wind turbine platform 70 is similar to the floating composite wind turbine platform 60 illustrated in FIG. 11 and includes the tower 62 attached to the hull platform 44 at the connection joint 66. Mooring lines 74 are attached to the hull platform 44 and further anchored to the seabed S. The wind turbine 20 is mounted to the tower 62. Cable stays 64 are attached to the hull platform 44 and further attached to the tower 62.

In lieu of the taut mooring lines 48 shown in FIG. 11, the mooring lines 74 are configured as catenary moorings, as described above. The floating composite wind turbine platform 70 further includes a large mass 72 suspended from the hull platform 44 by cables 76. The mass 72 may have any desired weight, such as a weight of about 1000 kg. Alternatively, the mass 72 may have a weight within the range of from about 10 kg to about 1500 kg. The mass 72 may be formed form any material having the desired weight. Non-limiting examples of material suitable for use as the mass 72 include one or more rocks, pieces of concrete, and pieces of steel. These one or more items may be contained in a net, a bucket, or other outer shell or container.

A first end (lower end when viewing FIG. 12) of each cable 76 is attached to the mass 72. A second end (upper end when viewing FIG. 12) of each cable 76 is attached to a distal end of each leg 52 of the hull platform 44. Non-limiting examples of suitable cable material include steel rope or cable, steel chain segments, and synthetic rope such as nylon rope, and composite tendons such as FRP tendons.

Referring now to FIG. 13, a fifth embodiment of a floating composite wind turbine platform 80 is shown anchored to the seabed S. The illustrated floating wind turbine platform 80 is a mooring line stabilized, semi-submersible type platform and includes a tower 82 attached to a pontoon platform 84. Mooring lines 90 are attached to the pontoon platform 84 and further anchored via anchors 19 to the seabed S. The wind turbine 20 is mounted to the tower 82. The tower 82 may be any suitable tower and may be identical to the tower 12 described above. Thus, the tower 82 may be formed from reinforced concrete, FRP composite, or from steel as described above.

The pontoon platform 84 includes a plurality of buoyancy members or pontoons 86 connected by structural members 88. In the illustrated embodiment, the pontoon platform 84 has three pontoons 86. In other embodiments, the pontoon platform 84 may have more or less than three pontoons 86. The illustrated pontoons 86 have a radially extending flange 87 formed at a first end 86A of each pontoon 86. Alternatively, the pontoons 86 may be formed without the flanges 87.

In the embodiment of the pontoon platform 84 as shown in FIG. 13, the tower 82 may be attached to one pontoon 86 via a connector joint (not shown). This connector joint may be any of the connection joints described and illustrated in FIGS. 2, 3A through 3L, and 4. In a second embodiment of the pontoon platform 84' as shown in FIG. 16, the pontoons 86 are connected to a central hub 92 by structural members 94. In this embodiment, the tower 82 is attached to the central hub 92 via a connector joint (not shown), but such as any of the connection joints described and illustrated in FIGS. 2, 3A through 3L, and 4.

In the illustrated embodiment, the pontoons 86 are substantially hollow and define a cavity. A portion of the cavity of any of the pontoons 86 may be filled with ballast B to help stabilize the floating wind turbine platform 80. Alternatively, the ballast B may fill the entire cavity of any of the pontoons 86. Non-limiting examples of suitable ballast material include water, rocks, copper ore, and other dense ores. Other sufficiently dense material may also be used as ballast to fill or partially fill the cavities of the pontoons 86.

The pontoons 86 may be formed from reinforced concrete, FRP composite, or from steel as described above. The structural members 88 may also be formed from reinforced concrete, FRP composite, or from steel as described above.

The pontoon platform 84 may have any desired dimensions. For example, each of the pontoons 86 may have an outside diameter of about 12 meters and a height of about 30 meters. Alternatively, the pontoons 86 may have an outside diameter within the range of from about 10 to about 50 meters and a height within the range of from about 10 meters to about 40 meters. A distance D measured between the centers of the pontoons 86 may be about 30 meters. Alternatively, the distance D may be within the range of from about 15 meters to about 100 meters.

A first end (upper end when viewing FIG. 13) of each mooring line 90 is attached to one pontoon 86 of the pontoon platform 84. A second end (lower end when viewing FIG. 13) of each mooring line 90 is attached or anchored to the seabed S by the anchor 19, as described above. In the illustrated embodiment, the mooring lines 90 are configured as catenary moorings. The mooring lines 90 may be formed from any desired material. Non-limiting examples of suitable mooring line material include steel wire rope or cable, steel chain segments, and synthetic rope such as nylon rope, and composite tendons such as FRP tendons.

Referring now to FIG. 14, a sixth embodiment of a floating composite wind turbine platform 100 is shown anchored to the seabed S. The illustrated floating wind turbine platform 100 is substantially similar to the floating composite wind turbine platform 80 illustrated in FIG. 13 and includes a tower 102 attached to the pontoon platform 84, as described above. Each mooring line 90 is attached to one pontoon 86 of the pontoon platform 84 and further anchored to the seabed S via the anchor 19. The wind turbine 20 is mounted to the tower 102. A cable stay 104 is attached to each pontoon 86 of the pontoon platform 84 and further attached to a first end 102A of the tower 102.

Because the cable stays 104 reduce bending stress in the tower 102, the tower 102 can be of a smaller diameter than the tower 82 illustrated in FIG. 13. For example, the tower 102 may have any suitable outside diameter and height. In the illustrated embodiment, the outside diameter of the tower 102 is about 4 meters. Alternatively, the outside diameter of the tower 102 may be any other desired diameter, such as within the range of from about 3 meters to about 12 meters. In the illustrated embodiment, the height of the tower 102 is about 90 meters. Alternatively, the height of the tower 102 may be within the range of from about 50 meters to about 140 meters.

Referring now to FIG. 15, the pontoon platform 84 may include a rotating turret 106 mounted to a lower end of the pontoon platform 84. In the embodiment illustrated in FIG. 15, the mooring lines 90 are attached to the rotating turret 106, rather than the pontoons 86. In this embodiment, the floating composite wind turbine platform, such as the platforms 80 and 100, may rotate relative to the turret 106 and thus self-align in response to the wind direction and ocean currents.

Figure 18A:
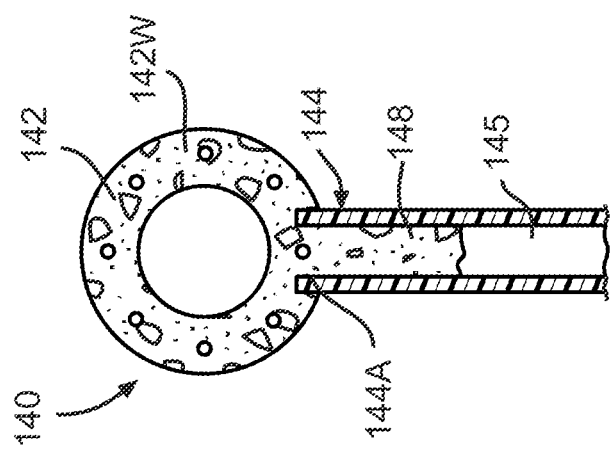
FIG. 18A is a top plan view in cross section of a portion of a first embodiment of a joint between the pontoon and the structural member of the pontoon platform illustrated in FIG. 17.
Figure 18B:
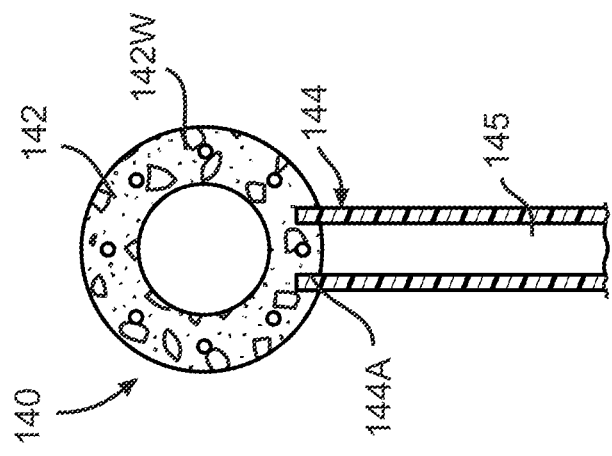
FIG. 18B is a top plan view in cross section of a portion of a second embodiment of the joint between the pontoon and the structural member of the pontoon platform illustrated in FIG. 17.

Referring now to FIGS. 17, 18A, and 18B, a third embodiment of the pontoon platform is illustrated at 140. The pontoon platform 140 includes a plurality of buoyancy members or pontoons 142 connected by structural members 144. In the illustrated embodiment, the pontoon platform 140 has three pontoons 142. In other embodiments, the pontoon platform 140 may have more or less than three pontoons 142. The illustrated pontoons 142 have a radially extending flange 146 formed at a first end 142A of each pontoon 142. Alternatively, the pontoons 142 may be formed without the flanges 146.

In the illustrated embodiment, the pontoons 142 are substantially hollow and define a cavity and are formed from reinforced concrete. The illustrated structural members 144 are substantially tubular, define a cavity 145, and are formed from FRP composite.

As best shown in FIG. 18A, in a first embodiment of the pontoon platform 140, the pontoon 142 includes an outer wall 142W. First and second ends 144A and 144B, respectively, of the structural members 144 are inserted into the outer walls 142W of the pontoons 142. The concrete that forms the outer wall 142W extends into the cavities 145 of each structural member 144 to define a rigidity member 148. When cured, the rigidity member 148 provides added rigidity to the pontoon platform 140.

A second embodiment of the pontoon platform is illustrated at 140' in FIG. 18B. The pontoon platform 140' is substantially identical to the pontoon platform 140, but does not include the rigidity member 148. The first and second ends 144A and 144B, respectively, of the structural members 144 are inserted into and bonded to the outer walls 142W of the pontoons 142.

The rigidity member 148 may be formed by inserting the first and second ends 144A and 144B, respectively, of the structural members 144 into a pontoon form (not shown) which defines the shape of the pontoon to be formed. Concrete may be poured into the pontoon form to define the outer wall 142W of the pontoon 142. This concrete will also flow into the cavity 145 of the structural member 144. When the concrete is cured, the concrete of the rigidity member 148 is contiguous with the concrete of the outer wall 142W of the pontoon 142, thus the first and second ends 144A and 144B of the structural members 144 are respectively embedded in and bonded to the pontoons 142. Additionally, an outside surface of each of the first and second ends 144A and 144B, respectively, of the structural members 144 may be textured such that each outside surface interlocks and bonds with the concrete of the outer walls 142W of the pontoons 142.

It will be understood that the structural members 144 may also be formed from reinforced concrete or from steel as described above.

In the embodiment of the pontoon platform 140 as shown in FIG. 17, a tower, such as the tower 82 (illustrated by a phantom line in FIG. 17) may be attached to one of the pontoons 142 via a connector joint (not shown). This connector joint may be any of the connection joints described and illustrated in FIGS. 2, 3A through 3L, and 4.

Referring now to FIG. 21, a fourth embodiment of the pontoon platform is illustrated at 440. The pontoon platform 440 includes a plurality of buoyancy members or pontoons 442 connected to a central pontoon 444 by structural members 446. In the illustrated embodiment, the pontoon platform 440 has three pontoons 442. In other embodiments, the pontoon platform 440 may have more or less than three pontoons 442. The illustrated pontoons 442 have a radially extending flange 448 formed at a first end 442A of each pontoon 442. Alternatively, the pontoons 442 may be formed without the flanges 448. In this embodiment, a tower, such as the tower 82, is attached to the central pontoon 444 via a connector joint (not shown), but such as any of the connection joints described and illustrated in FIGS. 2, 3A through 3L, and 4. Alternatively, the tower 82 may be attached to any of the three pontoons 442.

Each of the illustrated pontoons 442 is formed from a plurality of rings or sections 450. The sections 450 are connected to each other at connection joints 452. As described above regarding the hull 14, the sections 450 may be fabricated from FRP composite material, reinforced concrete, or steel. The sections 450 may be connected by post-tensioning cables 454 running through some or all of the sections 450 thereby clamping the sections 450 together and defining the pontoon 442. A sealing member, such as the gasket G, may be disposed between the sections 450 to seal the connection joints 452. Alternatively, the connection joints 452 may be any of the connection joints described and illustrated in FIGS. 2, 3A through 3L, and 4.

Attachment rings 456 are circumferentially mounted to an outside surface of the pontoons 442 and provide a mounting structure for attaching the structural members 446 to the pontoons 442. The attachment rings 456 may be formed from steel, FRP composite material, or reinforced concrete. Alternatively, the attachment rings 456 may be mounted in the connection joint 452 between two adjacent sections 450.

Once the sections 450 are assembled to form the pontoon 442, a closing member 458 may be attached to the second end 442B of the pontoon 442.

Referring to FIG. 22, there is illustrated at 510 a seventh embodiment of a floating wind turbine platform. The floating wind turbine platform 510 includes a foundation 514 that supports a composite tower 512. The composite tower 512 supports a wind turbine 516. The illustrated composite tower 512 is made of light-weight, corrosion resistant material, such as a fiber reinforced polymer such as E-glass and a polyester polymer resin. The composite tower 512 may be made of other desired materials that provide support for the wind turbine 516. The composite tower 512 walls may be a solid structure, or may be a cored structure. For example, the composite tower 512 may be any of the towers described above, including for example the towers 12, 12', 212, and 312. The foundation 514 is structured and configured to float, semi-submerged, in a body of water. Mooring lines 518 may be attached to the wind turbine platform 510 and further attached to anchors, such as the anchors 19 shown above, in the seabed to limit to movement of the wind turbine platform 510 on the body of water. It will be understood that the illustrated mooring lines 518 may be slack, i.e., catenary mooring lines, such as shown in FIGS. 12 through 15, and do not have to be in tension during normal operation of the wind turbine platform 510. The foundation is semisubmersible, and therefore a portion of the foundation 514 will be above water when the foundation is floating in the water. Further, the foundation 514 will float upright even with the bending load or moment applied to the platform by the wind stress exerted on the tower 512 and the wind turbine 516. This is in contrast to a vertical tension system such as that shown in FIG. 10, wherein if the tension lines are cut, the platform will tip over.

The illustrated foundation 514 is formed from three bottom beams 521 that extend radially outwardly from an interior or center column 522. In the illustrated embodiment, the bottom beams 521 are positioned such that the angle between the centerlines of adjacent bottom beams 521 is approximately 120-degrees. The illustrated bottom beams 521 are pre-stressed concrete members. It will be understood that the bottom beams 521 may be formed from other desired materials. The benefit of using concrete is that it is lighter than other materials, such as steel, and is more resistant to corrosion than steel is. Three outer columns 524 are mounted at or near the distal ends of the bottom beams 521. The outer columns 524 are further optionally connected to the center column 522 by top beams 526. Optional struts 528 extend between and connect the upper portion or end of the center column 522 and the distal ends of the bottom beams 521 or the lower ends of the outer columns 524. The embodiment of the floating wind turbine platform 510 illustrated in FIG. 22 has a height of about 35 meters (115 ft). The embodiment of the tower 512 illustrated in FIG. 22 has height of about 85 meters (279 ft). It will be understood that the floating wind turbine platform 510 and the tower 512 may be manufactured at any desired height.

Each outer column 524 may be formed from a plurality of sections 524S, as shown in FIGS. 22, 28A, and 28B. The center column 522 may also be formed from a plurality of sections 522S, as also shown in FIGS. 22, 28A, and 28B.

A first embodiment of the method of assembling and deploying the floating wind turbine platform 510 is illustrated in FIGS. 23A through 29. As shown, the wind turbine platform 510 may be assembled in two phases.

In a first phase (phase I) of assembly, three wing members 530 may be cast or placed on separate barges B. Each illustrated wing member 530 includes a bottom beam 521 and a base portion 524P of an outer column 524. If desired, the cast wing members 530 may be post-tensioned with reinforcements, as illustrated with the dashed lines in FIGS. 23A and 23B. A strut anchor 528A may be formed between and attached to the bottom beam 521 and the base portion 524P. Each of the illustrated barges B has a deck surface of about 150 ft×60 ft, although barges having other suitable sizes of deck surfaces may be used. In the illustrated embodiment, the base portion 524P has a height of about 32 ft, although the base portion 524P may have any other suitable height.

After the wing members 530 have been cast, the three barges B will be moved to a relatively calm area, such as a harbor area. The three barges B containing the three wing members 530 will be fastened together with an attachment structure, such as a temporary frame 536 shown in FIGS. 24A and 24B. In the illustrated embodiment, the frame 536 is a substantially triangular shaped steel structure. Alternatively, the frame 536 may have other desired sizes and shapes and may be formed from other material.

Optionally, falsework (not shown) may be used to support the frame 536 during construction. The bottom keystone 532 will then be constructed within or on the frame 536. The keystone 532 includes a center column support portion 522P upon which the center column 522 will be built, as described below. The keystone 532 also includes circumferentially spaced connection faces 623 oriented to connect to each of the bottom beams 521, as shown in FIG. 31. After the keystone 532 is completed and attached to each of the three bottom beams 521, the falsework and the frame 536 may be removed.

The three wing members 530 and the center piece 532 define the foundation 514. If desired, the entire foundation 514 may be post-tensioned.

As shown in FIG. 25, the three barges B may then be submerged and removed from beneath each wing member 530 of the foundation 514, allowing the foundation 514 to float on its own. The floating foundation 514 may then be towed to a dock (not shown), or other suitable facility, for a second phase of assembly.

In the illustrated embodiment of the method of assembling and deploying the floating wind turbine platform 510, the second phase (phase II) occurs with the foundation 514 floating adjacent a dock in an area of relatively calm water, as shown in FIGS. 26A through 29. Jump forms 538 will be installed on the base portions 524P of the wing members 530 and on the keystone 532. In the illustrated embodiment, the jump forms 538 are structured and configured to allow the casting of sections 524S of the outer columns 524 and sections 522S of the center column 522. In the illustrated embodiment, the sections 524S and 522S have a height of about 12 ft, although the sections 524S and 522S may have any other suitable height. A portion of each outer column 524 will then be constructed up to a predetermined height to allow for construction and attachment of the struts 528.

Falsework 540 will then be constructed on each bottom beam 521, and will be used to pour a first segment 528P1 of the diagonal strut 528. It will be understood that the first segment 528P1 of the strut 528 may be cast at another site and then attached to the strut anchor 528A of the foundation 514. In the embodiment illustrated in FIG. 26C, the first segment 528P1 of the strut 528 is attached to both the base of the outer column 524 and the bottom beam 521 via the strut anchor 528A. Alternatively, the first segment 528P1 of the strut 528 may be attached to only the base of the outer column 524.

Figure 27B:
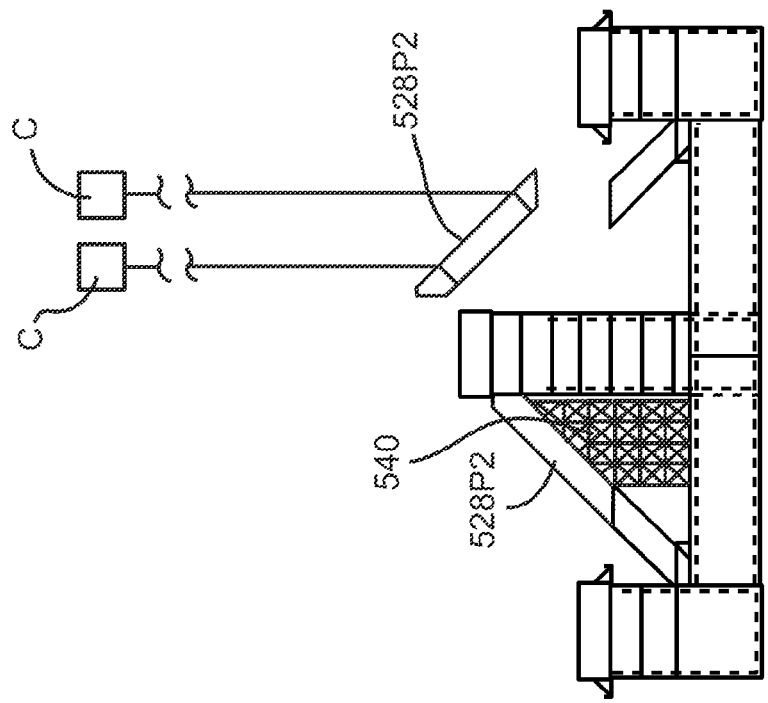
FIG. 27B is a second side elevational view of the second step of the second phase of the method of assembling and deploying the floating wind turbine platform illustrated in FIGS. 26A, 26B, and 26C, showing the struts being completed.
Figure 27A:
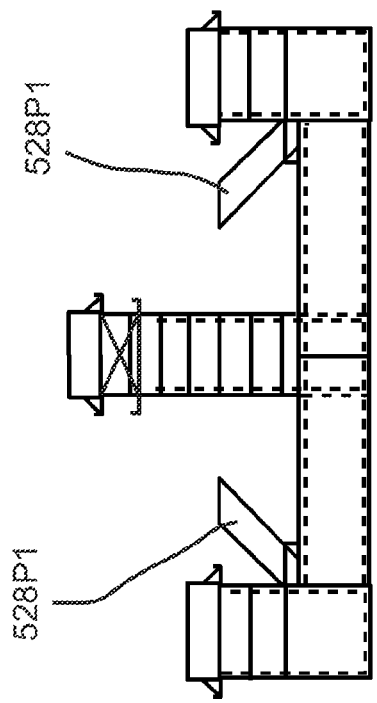
FIG. 27A is a first side elevational view of the second step of the second phase of the method of assembling and deploying the floating wind turbine platform illustrated in FIGS. 26A, 26B, and 26C, showing the center column completed.

Upon completion of the first segments 528P1 of the struts 528, the center column 522 will be constructed to its final desired height, as shown in FIG. 27A. Once the center column 522 is constructed, the struts 528 will be completed. In the embodiment illustrated in FIG. 27B, a second segment 528P2 of the strut 528 is cast at another site, such as an on-shore site, and then attached to the first segment 528P1 and the center column 522. In the embodiment illustrated in FIG. 27B, the remaining segments 528P2 of the struts 528 are lifted into place with two cranes C. Alternatively, additional falsework 540 may be constructed on each bottom beam 521, and the second segment 528P2 of the strut 528 may be cast in place in the same manner as the first segment 528P1 of the strut 528. Upon completion of the struts 528, the outer columns 524 will be constructed to their final desired height. Once constructed and attached, the struts 528 may be post-tensioned as required.

Figure 29:
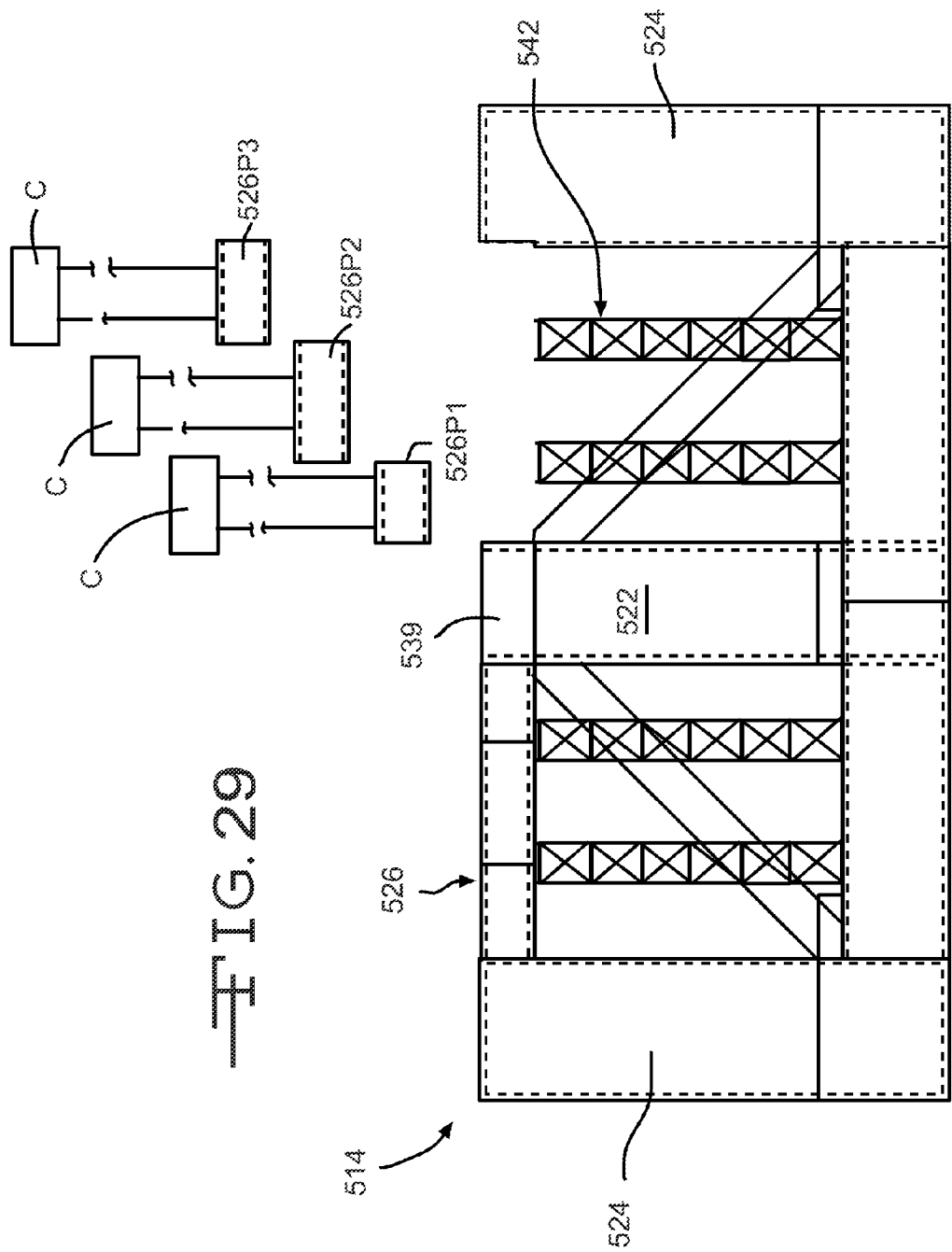
FIG. 29 is a side elevational view of the fourth step of the second phase of the method of assembling and deploying the floating wind turbine platform illustrated in FIGS. 26A through 28B, showing the top beams being completed.

The top beams 526 may be pre-cast at another site, such as an on-shore site, and then attached between the outer columns 524 and the top keystone 539 of the center column 522, as shown in FIG. 29. In the embodiment illustrated in FIG. 29, the top beams 526 are formed in segments 526P1, 526P2, and 526P3 and then installed on shoring towers 542 constructed on the bottom beams 521. The illustrated top beam segments 526P1, 526P2, and 526P3 are lifted into place with one or more cranes. Alternatively, the top beam segments 526P1, 526P2, and 526P3 may be cast in place. Additionally, the top beam 526 may be formed as a single piece and attached between the outer columns 524 and the center column 522 using the shoring towers 542. The top beams 526 may be post-tensioned as required. Upon completion of the top beams 526, the wind turbine platform 510 is ready for further outfitting and attachment of the tower 512 and wind turbine 516.

Another embodiment of the method of assembling and deploying the floating wind turbine platform 610 is illustrated in FIGS. 30 through 40. The method of assembling and deploying the floating wind turbine platform 610 illustrated in FIGS. 30 through 40 is a modular method of assembly that is similar to the first embodiment of the method of assembling and deploying the floating wind turbine platform 510 illustrated in FIGS. 23A through 29.

As shown in FIG. 30, bottom wing members 630 are deployed on the barges B. The bottom wing members 630 include the bottom beam 621, a base portion 624P of an outer column 624, and a first segment 628P1 of the diagonal strut 628. If desired, bottom wing members 630 may be post-tensioned. As shown in FIG. 31, the keystone 632 is also deployed on a barge B. The keystone 632 is attached to one of the three wing members 630 so that the barge B can be removed from under the keystone 632. The remaining two wing members 630 may then be moved into contact with, and attached to, the keystone 632, as shown in FIGS. 32 and 33. The three wing members 630 and the keystone 632 define the foundation 614, as shown in FIG. 33. The barges B may then be moved from under the foundation 614 as described above and as shown in FIG. 34. It will be understood that the wing members 630 and the keystone 632 may be cast on the barges B, or cast at another site, such as an on-shore site, and then moved to the barges B.

Figure 35:
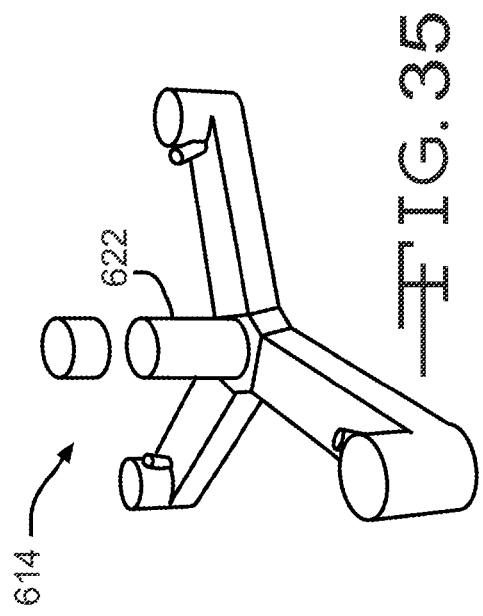
Figure 37:
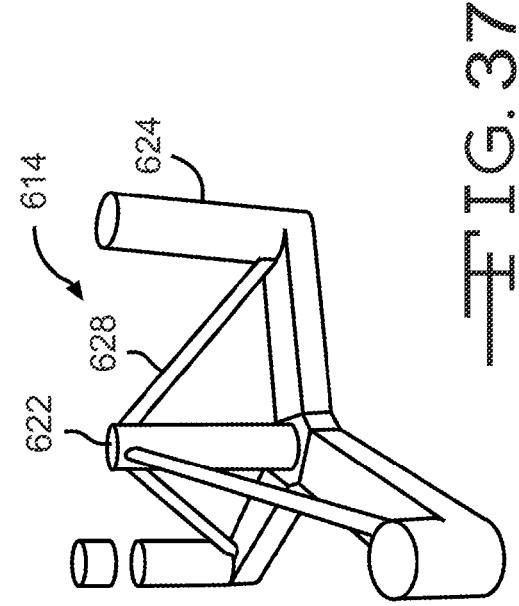
Figure 34:
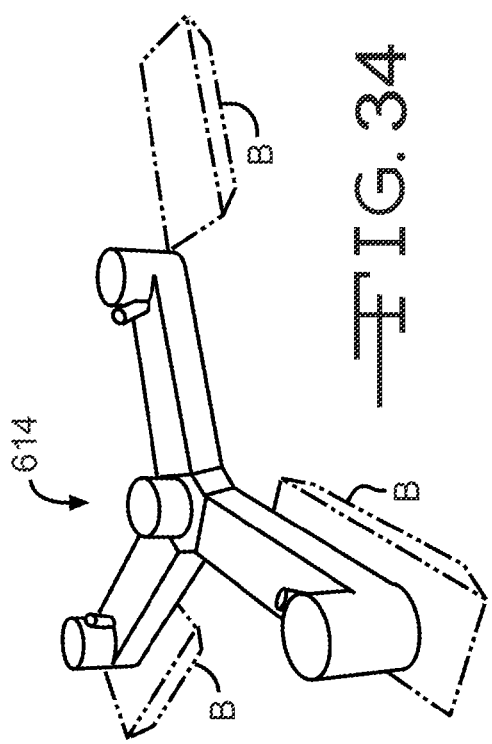
Figure 36:
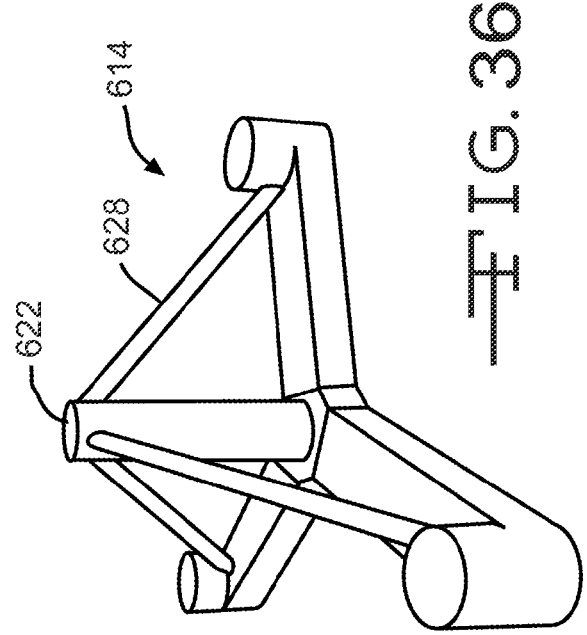

As shown in FIG. 35, the center column 622 will be constructed to its final desired height. The struts 628 will then be completed, as shown in FIG. 36. The outer columns 624 will then be constructed to their final desired height as shown in FIG. 37. The center column 622 and the outer columns 624 may be formed by any desired method, such as for example by jump forming as described above.

As shown in FIG. 38, upon completion of the outer columns 624, the top beams 626 may be attached between the outer columns 624 and the center column 622. The top beams 626 may pre-cast at another site, such as an on-shore site, and then attached, formed in segments and then installed as described above, or may be cast in place. The wind turbine platform 610 is then ready for further outfitting and attachment of the tower 612 and wind turbine 616, as shown in FIGS. 39 and 40. It is to be understood that the assembly of the various elements of the foundation 614 can be completed in any order.

As shown in FIG. 41, in an alternate embodiment of a method of constructing the wind platform, the three wing members 630 can be joined together by a keystone 632 and supported by two barges B' during assembly. The barges can later be removed at the appropriate stage in the assembly process.

Figure 42:
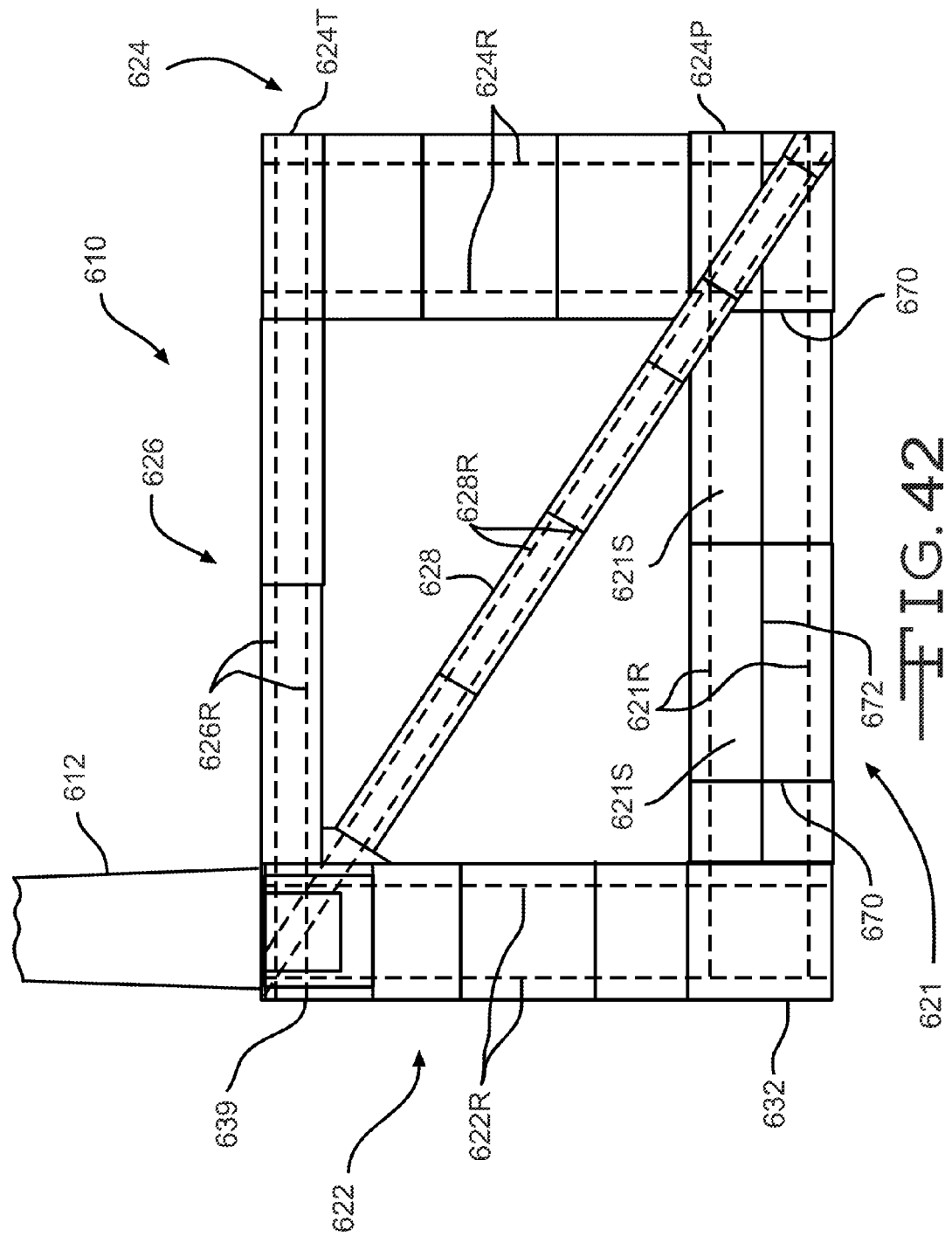
FIG. 42 is an elevational view in cross-section illustrating structural aspects of elements of the platform.

As shown in FIG. 42, and as explained above, the basic structure of the wind turbine platform 610 includes the following major structural elements: bottom beams 621, bottom keystone 632, center column 622, top keystone 639, struts 628, top beams 626 and outer columns 624. These major structural elements are made of cast concrete, although other materials can be used. These major structural elements are made in segments, although they could be made all at once as a single element. In order to strengthen these elements, they are subjected to compression forces by the application of post-tensioning reinforcements. Such reinforcements can be in the form of steel cables or any other suitable tension members. The application of the post-tensioning reinforcements helps provide the major structural elements in a form that will maintain their integrity under the stresses when the wind turbine towers are deployed out in the ocean. Further, the post-tensioning reinforcements provide sufficient strength to these major structural elements to enable the cavities defined in each of the major structural elements to be maintained as hollow spaces, thereby preserving the buoyancy of the major structural elements.

As shown in FIG. 42, the bottom beam is provided with post tensioning reinforcements 621R. These extend horizontally through the entire length of the bottom beam 621, including the bottom section 624P of the outer column 624, and the keystone 632. Although the reinforcements 621R are shown as being positioned in the upper and lower regions of the bottom beam 621, they can be placed in different positions within or around the lower beam. The post tensioning reinforcements 621R place the entire bottom beam 621 in compression, thereby enhancing the strength of the bottom beam 621.

As shown in FIG. 44, the keystone 632 includes a number of webs 660, arranged in pairs in a parallel orientation. The webs 660 include conduits or channels 664 extending within the webs 660 and along elongated or longitudinal axes of the webs 660. The post tensioning reinforcements 621R extend through the channels 664 of the webs, and are anchored at the ends 662 of webs 660. It can be seen that the keystone 632 has three attachment faces 623, oriented relative to each other at approximately 120 degree for attachment of three bottom beams 621. The keystone 632 and can accommodate the reinforcements 621R for all three bottom beams 621. The faces are provided with orifices 666 for initially bolting the lower beams 621 to the keystone 632. Other means of attachment can also be used. As a result of this arrangement, the post-tensioning reinforcements cause pre-compression in the concrete of the bottom beams in the radial direction between the outer column 624 and the center column 622.

As further shown in FIG. 42, vertically oriented post-tensioning reinforcements 624R cause pre-compression in the concrete of the outer columns 624 in the vertical direction. Further, vertically oriented post-tensioning reinforcements 622R cause pre-compression in the concrete of the center column 622 in the vertical direction. Also, horizontally oriented post-tensioning reinforcements 626R cause pre-compression in the concrete of the top beams 626 in the vertical direction. The reinforcements 626R extend from the top section 642T of the outer column 624 through the top keystone 639 at the top of the center column 639. Likewise, diagonally-oriented post-tensioning reinforcements 628R cause pre-compression in the concrete of the struts columns 624 in the direction of the length of the struts 628.

As shown in FIG. 42, the following major structural elements—bottom beams 621, center column 622, struts 628, top beams 626 and outer columns 624—can be formed in segments or sections. For example, the bottom beam 621 includes sections 621S that are defined by bulkheads 670 that are perpendicular to the longitudinal axes of the lower beams 621. The bulkheads can be steel, composite material, or concrete, or any combination of those materials. The bulkheads can be in the form of ribs, or hollow or solid diaphragms. The bulkheads 670 help to resist hydrostatic or hydrodynamic pressures experienced by the major structural elements, such as the bottom beam 621. Further, the bulkheads 670 allow for adequate load transfer from component to component (e.g., between the bottom beams 621 and the bottom keystone 632, and between the bottom beams 621 and the outer column 624), and allow accommodation and mitigation of the high levels of stress developed during post-tensioning.

In addition to the vertically oriented bulkheads 670 of the bottom beam 621, the design can include secondary webs or membranes 672 oriented horizontally. These secondary membranes can be of any suitable material, size and shape. The secondary membranes allow for adequate load transfer from component to component (e.g., between the bottom beams 621 and the keystone 632, and between the bottom beams 621 and the outer column 624) and to accommodate and mitigate high levels of stress developed during post-tensioning.

In a manner analogous to the use of bulkheads 670 and secondary membranes 672 for strengthening the lower beams 621, additional bulkheads and membranes can be used to strengthen the top beams 626, center column 622, outer columns 624 and struts 628.

As shown in FIG. 43, the completed wind generating device 644 includes three lower beams 621, three top beams 626, the tower 612 the wind turbine 616 and the turbine blades 646. The struts 628 are not shown in FIG. 43 because they are covered up by the top beams 626.

FIG. 45 illustrates that the platform 714 can be constructed using a center column 722 and four wings 730 each having and outer column 728. It is to be understood that the platform can be made of any number of wings. The wings can be oriented with equal circumferential angular spacing, such as being circumferentially spaced at 90 degrees shown in FIG. 45.

The cross-sectional shapes of beams and struts can be square, rectangular, circular or any other suitable shape. Also, although an embodiment of the wind turbine platform 610 includes horizontal lower beams connecting the center column with the outer column, horizontal top beams connecting the center column with the outer column, and struts, it is to be understood that in alternate embodiments the platform 610 is constructed with less than all of those major structural elements. For example, in one embodiment, the platform 610 is constructed without the struts 628. In another example, the platform is constructed without the top beams 626.

The lower beams 621, top beams 626 and struts 628 have sufficient structural integrity, and the connections between the lower beams 621, top beams 626 and struts 628 are sufficiently solid, that in some embodiments there is no need to connect adjacent outer columns to each other with structurally substantial perimeter linkages. The connection through the keystones 632 and 639 is sufficient to maintain structural integrity of the platform 610 when in operation in the open sea.

In one embodiment the bottom beams and top beams include post-tensioning reinforcements, causing precompression in the concrete in the horizontal or vertical tangential directions, perpendicular to the radial lines between the outer columns and the center column.

In another embodiment the bottom beams are hollowed box beams in which one or more interior hollow spaces is: (a) filled with air, (b) partially filled with water, or (c) substantially filled with water.

In yet another embodiment the hollow spaces are mostly filled with air during dock-side operations, and partially or fully filled with ballast water during transit and in its final moored position within a wind farm offshore.

In another embodiment one or more of the interior spaces of the hollowed box beam includes an openable orifice open to the surrounding sea water, thereby enabling at least partial equalization of interior and exterior water pressures.

The platform of claim 1 with mooring lines of general catenary shape attached to the outer radial columns on one side and to anchor points on the sea bed on the other side, allowing the semisubmersible platform to stay on station.

The platform in claim 22 in which the anchor points on the sea bed are one of: (a) a drag anchor, (b) a drilled rock anchor, (c) a gravity anchor, (d) a suction anchor, and (e) a combination of gravity-suction anchor.

The principle and mode of operation of the wind turbine platform have been described in its preferred embodiments. However, it should be noted that the wind turbine platform described herein may be practiced otherwise than as specifically illustrated and described without departing from its scope.

What is claimed is:

1. A semisubmersible wind turbine platform capable of floating on a body of water and supporting a wind turbine, the wind turbine platform comprising:
    a vertical center column; and
    three or more vertical outer columns spaced radially from the center column, each of the outer columns being connected to the center column with:
        a bottom beam extending substantially horizontally between a lower portion of the outer column and a lower portion of the center column;
        a top beam extending substantially horizontally between an upper portion of the outer column and an upper portion of the center column; and
        a strut extending between a lower portion of the outer column and an upper portion of the center column;
    wherein, the center column and outer columns are made of concrete and are buoyant with sufficient buoyancy to support a wind turbine tower;
    wherein the outer columns are not connected to each other by substantial structural perimeter linkages;
    wherein the bottom beams, top beams and struts include post-tensioning reinforcements, causing precompression in the concrete between the outer columns and the center column;
    wherein the center and outer columns include post-tensioning reinforcements, causing vertical precompression in the concrete;
    wherein the bottom beams are connected to the central column with a bottom keystone at the central column, with the bottom keystone having circumferentially spaced connection faces for connection of the bottom beams to the keystone;
    wherein the post-tensioning reinforcements for the bottom beams are anchored in the bottom keystone;
    wherein the top beams are connected to the central column with a top keystone at the central column, with the top keystone having circumferentially spaced connection faces for connection of the top beams to the keystone; and
    wherein the post-tensioning reinforcements for the top beams are anchored in the top keystone.

2. A semisubmersible wind turbine platform capable of floating on a body of water and supporting a wind turbine thereon, the wind turbine platform comprising:
    a vertical center column; and
    three or more vertical outer columns spaced radially from the center column, each of the outer columns being connected to the center column with:
        a bottom beam extending substantially horizontally between a lower portion of each outer column and a lower portion of the center column;
    wherein the bottom beams are connected to the central column with a bottom keystone at the central column, with the bottom keystone having circumferentially spaced connection faces for connection of the bottom beams to the bottom keystone;
    wherein the bottom beams include post-tensioning reinforcements, causing precompression in the concrete in the radial direction between the outer columns and the center column, and the post-tensioning reinforcements are anchored in the bottom keystone;
    wherein the center column and outer columns are made of concrete and are buoyant with sufficient buoyancy to help support a wind turbine tower; and
    wherein the outer columns are not connected to each other by structurally substantial perimeter linkages.

3. The platform of claim 2 in which the bottom beams are primarily made of concrete.

4. The platform of claim 2 in which the bottom beams are primarily made of steel.

5. The platform of claim 2 including a strut extending between a lower portion of each outer column and an upper portion of the center column.

6. The platform of claim 5 in which the struts are primarily made of concrete.

7. The platform of claim 5 in which the struts are primarily made of steel.

8. The platform of claim 2 in which the post-tensioning reinforcements cause precompression in the concrete in the horizontal or vertical tangential directions, perpendicular to the radial lines between the outer columns and the center column.

9. The platform of claim 2 in which the center column and the outer columns include post-tensioning reinforcements, causing precompression in the concrete in the vertical direction.

10. The platform of claim 2 in which the center column and the outer columns include post-tensioning reinforcements, causing precompression in the concrete in the horizontal direction.

11. The platform of claim 2 including a strut extending between a lower portion of each outer column and an upper portion of the center column, with each strut including post-tensioning reinforcements, causing precompression in the concrete a direction along the length of the strut.

12. The platform of claim 2 in which the bottom beams include structural reinforcement to increase global and local bending strength.

13. The platform of claim 12 in which the structural reinforcement is in the form of bulkheads oriented substantially perpendicular to an axis of the bottom beams, respectively.

14. The platform of claim 12 in which the structural reinforcement is in the form of hollow or solid diaphragms oriented substantially in a direction parallel to the longitudinal axes of the bottom beams.

15. The platform of claim 2 in which there are three outer columns equally circumferentially spaced about the center column.

16. The platform of claim 2 in which the bottom beams are hollowed box beams in which one or more interior hollow spaces is: (a) filled with air, (b) partially filled with water, or (c) substantially filled with water.

17. The platform of claim 16 in which the interior hollow spaces are mostly filled with air during dock-side operations, and partially or fully filled with ballast water during transit and in its final moored position within a wind farm offshore.

18. The platform of claim 16 in which one or more of the interior hollow spaces of the hollowed box beam includes an openable orifice open to the surrounding sea water, thereby enabling at least partial equalization of interior and exterior water pressures.

19. The platform of claim 2 with mooring lines of general catenary shape attached to the outer columns on one side and to anchor points on the sea bed on the other side, allowing the semisubmersible platform to stay on station.

20. The platform in claim 19 in which the anchor points on the sea bed are one of: (a) a drag anchor, (b) a drilled rock anchor, (c) a gravity anchor, (d) a suction anchor, and (e) a combination of gravity-suction anchor.

21. The platform of claim 2 including a wind turbine tower mounted on the central column with the tower supporting a wind turbine.

22. The platform of claim 2 further including a top beam extending substantially horizontally between an upper portion of each outer column and an upper portion of the center column.

23. The platform of claim 22 in which the top beams are connected to the central column with a top keystone at the central column, with the top keystone having circumferentially spaced connection faces for connection of the top beams to the top keystone.

24. The platform of claim 23 in which the top beams include post-tensioning reinforcements, causing precompression in the concrete in the radial direction between the outer columns and the center column, and the post-tensioning reinforcements are anchored in the top keystone.

25. The platform of claim 24 in which the top keystone includes elongated structural webs having longitudinal axes, with the post-tensioning reinforcements extending through the webs along the longitudinal axes, respectively, of the webs.

26. The platform of claim 22 in which the top beams are primarily made of concrete.

27. The platform of claim 22 in which the top beams are primarily made of steel.

28. The platform of claim 22 in which the top beams include post-tensioning reinforcements, causing precompression in the concrete in the radial direction between the outer columns and the center column.

29. The platform of claim 22 in which the top beams include post-tensioning reinforcements, causing precompression in the concrete in the horizontal or vertical tangential directions, perpendicular to the radial lines between the outer columns and the center column.

30. The platform of claim 22 in which the top beams include structural reinforcement to increase global and local bending strength.

31. A semisubmersible wind turbine platform capable of floating on a body of water and supporting a wind turbine thereon, the wind turbine platform comprising:
a vertical center column; and
three or more vertical outer columns spaced radially from the center column, each of the outer columns being connected to the center column with a bottom beam extending substantially horizontally between a lower portion of each outer column and a lower portion of the center column;
wherein the bottom beams are hollowed box beams in which one or more interior hollow spaces is: (a) filled with air, (b) partially filled with water, or (c) substantially filled with water;
wherein one or more of the interior hollow spaces of the hollowed box beams includes an openable orifice open to the surrounding sea water, thereby enabling at least partial equalization of interior and exterior water pressures;
wherein the center column and outer columns are made of concrete and are buoyant with sufficient buoyancy to help support a wind turbine tower; and
wherein the outer columns are not connected to each other by structurally substantial perimeter linkages.

32. The platform of claim 31 in which the interior hollow spaces are mostly filled with air during dock-side operations, and partially or fully filled with ballast water during transit and in its final moored position within a wind farm offshore.

33. A wind generation apparatus comprising:
a floating wind turbine platform having a concrete central column, with a top portion of the central column having upwardly oriented anchor bolts embedded in the concrete; and
a wind turbine tower mounted onto the platform, the wind turbine tower being made of a fiber-reinforced composite material and having a bottom base plate, with the base plate being bolted to the concrete central column using the anchor bolts;
wherein the tower is an assemblage of tower sections, with the joint between adjacent sections being made by upwardly oriented anchor bolts embedded in the composite material.

34. A method of assembling a floating wind turbine platform comprising:
assembling at least three platform wings onto two or more floatation devices on a body of water, the platform wings each having a bottom beam and a base portion of an outer column, with each floatation device supporting one or more platform wings;
bringing the barges together arranged about a bottom keystone;
attaching each of the platform wings to the bottom keystone to form the lower portion of a foundation for a wind turbine platform, with the base portions of the outer columns spaced radially from the bottom keystone, and with the base portions of the outer columns equally circumferentially spaced about the bottom keystone;
removing the floatation devices from under the platform wings such that the foundation floats in the body of water to form a floating wind turbine platform, thereby allowing further construction of the platform in the water.

35. The method of claim 34 including:
adding column sections to the base portions of the outer columns to form completed outer columns;
constructing a center column above the bottom keystone;
adding a top keystone at the top of the center column; and
connecting top beams between the top keystone and upper portions of the outer columns.

36. The method of claim 35 including adding struts to the floating wind turbine platform, with the struts being positioned between the center column and the outer columns.

37. The method of claim 35 comprising adding a wind turbine tower and a wind turbine to the platform, towing the platform to a position suitable for operation of the wind turbine, and anchoring the platform at that position.

38. The method of claim 35 in which center column and outer columns are constructed of mostly hollow concrete sections.

39. The method of claim 35 in which the bottom beams, top beams, outer columns, center column and struts are constructed of substantially hollow concrete sections.

40. The method of claim 35 in which the bottom beams, top beams, outer columns, center column and struts are buoyant.

41. The method of claim 35 in which the bottom beams and top beams include structural reinforcement to increase bending strength.

42. The platform of claim 41 in which the structural reinforcement is in the form of bulkheads.

\* \* \* \* \*